United States Patent
Liddell et al.

(10) Patent No.: US 10,796,698 B2
(45) Date of Patent: Oct. 6, 2020

(54) HANDS-FREE MULTI-SITE WEB NAVIGATION AND CONSUMPTION

(71) Applicant: Microsoft Technology Licensing, LLC, Redmond, WA (US)

(72) Inventors: Derek Martin Liddell, Renton, WA (US); Cheng-Yi Yen, Redmond, WA (US); Darryl James Brown, Seattle, WA (US); Ye Tian, Sammamish, WA (US); Phu Le, Redmond, WA (US); Isabela Cabral Moreira, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/674,256

(22) Filed: Aug. 10, 2017

(65) Prior Publication Data

US 2019/0051305 A1    Feb. 14, 2019

(51) Int. Cl.
| | | |
|---|---|---|
| *G10L 15/26* | (2006.01) | |
| *G06F 3/16* | (2006.01) | |
| *G10L 15/30* | (2013.01) | |
| *G06F 16/9535* | (2019.01) | |
| *G06F 16/955* | (2019.01) | |
| *G10L 15/18* | (2013.01) | |

(52) U.S. Cl.
CPC ............... *G10L 15/26* (2013.01); *G06F 3/16* (2013.01); *G06F 16/9535* (2019.01); *G06F 16/9562* (2019.01); *G10L 15/1822* (2013.01); *G10L 15/30* (2013.01)

(58) Field of Classification Search
CPC .......................... G06F 17/30; G06F 17/30876
See application file for complete search history.

(56) References Cited

U.S. PATENT DOCUMENTS

| | | |
|---|---|---|
| 8,146,012 B2 | 3/2012 | Ramanathan |
| 8,209,331 B1 * | 6/2012 | Garg ..................... G06F 16/951 707/734 |
| 8,972,864 B2 | 3/2015 | Voreis et al. |
| 9,105,262 B2 | 8/2015 | Shih et al. |
| 9,374,431 B2 | 6/2016 | Kannan et al. |

(Continued)

OTHER PUBLICATIONS

Guim, Mark, "How to open websites by voice with Cortana", http://www.windowscentral.com/how-open-websites-voice-cortana, Published on: Apr. 20, 2014, (4 pp. total).

(Continued)

*Primary Examiner* — Paras D Shah
(74) *Attorney, Agent, or Firm* — Mark K. Young; Mayer & Williams PC

(57) ABSTRACT

A digital assistant supported on computing devices such as smartphones, tablet computers, personal computers (PCs), wearable devices, game consoles, connected car devices, virtual and mixed reality devices, and the like is configured to interact with a web browser to open multiple websites within a group responsively to a single voice input at a natural language interface. The user can select websites that are included in a given group through a user interface (UI), or the computing device may be configured to automatically create or recommend groups to the user based on monitored interactions and/or user behaviors (where the monitoring is performed with notice to the user and user consent).

6 Claims, 20 Drawing Sheets

(56) References Cited

U.S. PATENT DOCUMENTS

| | | | |
|---|---|---|---|
| 9,547,468 B2 | 1/2017 | Yen et al. | |
| 2007/0067317 A1 | 3/2007 | Stevenson | |
| 2007/0239674 A1* | 10/2007 | Gorzela | G06F 16/951 |
| 2008/0154603 A1* | 6/2008 | Oddo | 704/251 |
| 2010/0082670 A1 | 4/2010 | Chan et al. | |
| 2011/0119242 A1* | 5/2011 | Chen | G06F 16/9535 |
| | | | 707/706 |
| 2012/0216124 A1 | 8/2012 | Martino et al. | |
| 2014/0006399 A1* | 1/2014 | Vasudevan | G06F 16/9535 |
| | | | 707/737 |
| 2014/0229842 A1* | 8/2014 | Voreis | G06F 16/957 |
| | | | 715/738 |
| 2015/0143241 A1 | 5/2015 | Zeigler et al. | |
| 2016/0162591 A1* | 6/2016 | Dokania | G06F 3/0482 |
| | | | 707/738 |
| 2016/0171980 A1 | 6/2016 | Liddell et al. | |
| 2016/0179752 A1 | 6/2016 | Clark et al. | |
| 2016/0196111 A1 | 7/2016 | Pujari | |
| 2017/0147589 A1* | 5/2017 | LeBeau | H04M 3/4931 |
| 2017/0149633 A1* | 5/2017 | Arulesan | H04W 52/0254 |

OTHER PUBLICATIONS

Christian, et al., "A Comparison of Voice Controlled and Mouse Controlled Web Browsing", In Proceedings of ACM Conference on Assistive Technologies, Nov. 13, 2000, pp. 72-79 (8 pages total).

"International Search Report and Written Opinion Issued in PCT Application No. PCT/US2018/035928", dated Aug. 21, 2018, 11 Pages.

* cited by examiner

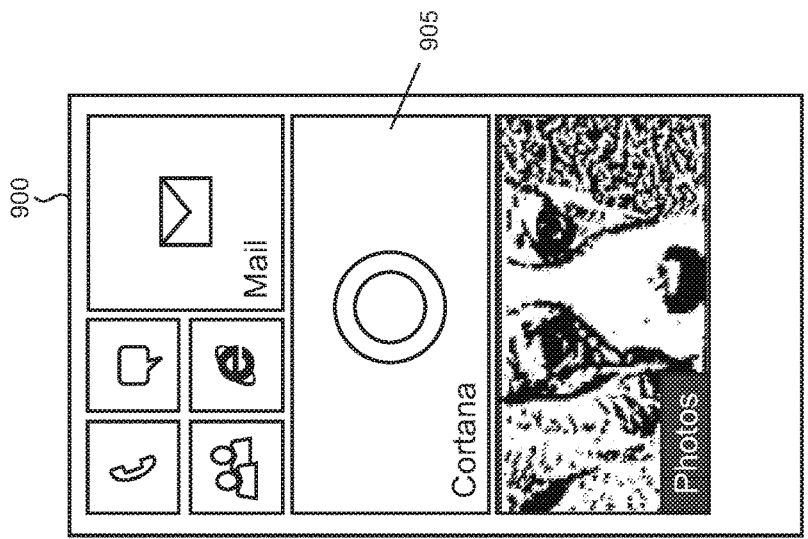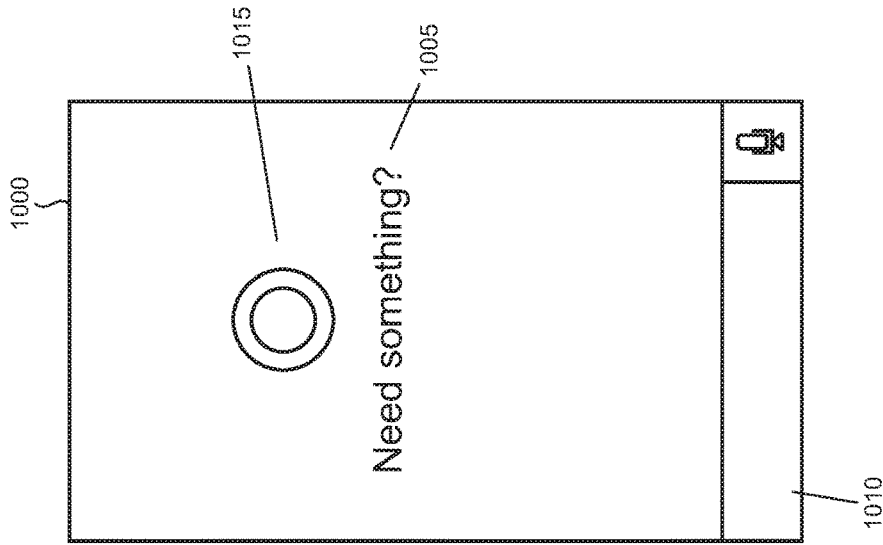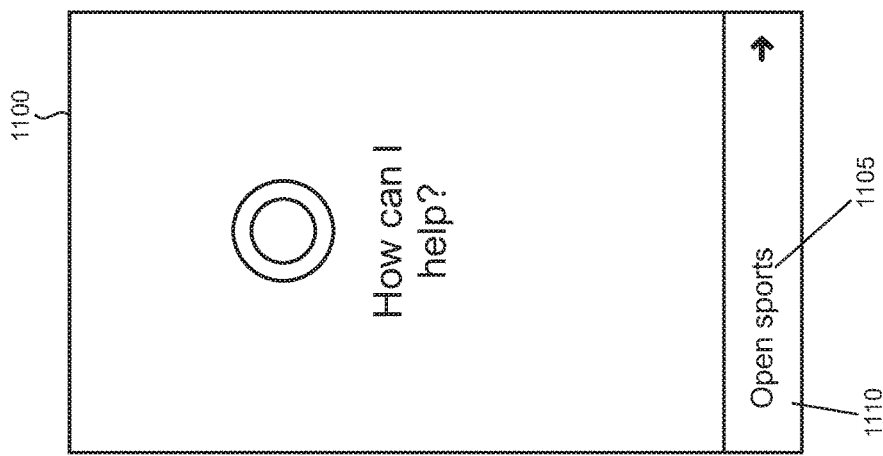

HANDS-FREE MULTI-SITE WEB NAVIGATION AND CONSUMPTION

BACKGROUND

Digital assistants can provide a variety of features for device users and can make it easier to interact with devices to perform tasks, get information, and stay connected with friends and colleagues using voice interactions. Typically, the user can interact with the digital assistant using voice inputs, and the digital assistant can speak to the user using its own voice.

SUMMARY

A digital assistant supported on computing devices such as smartphones, tablet computers, personal computers (PCs), wearable devices, game consoles, connected car devices, virtual and mixed reality devices, and the like is configured to interact with a web browser to open multiple websites within a group responsively to a single voice input at a natural language interface. The user can select websites that are included in a given group through a user interface (UI), or the computing device may be configured to automatically create or recommend groups to the user based on monitored interactions and/or user behaviors (where the monitoring is performed with notice to the user and user consent).

In various illustrative examples, the user can interact with the UI or digital assistant to provide a name for each of the grouped websites. The digital assistant can also automatically assign group names, or make name recommendations. The digital assistant listens for a voice input that includes the group name. For example, if the name of the group is "sports," then when the digital assistant hears the user speaking the words "open sports" the digital assistant recognizes the string and instructs the browser to open the websites in that group. Each website may be opened in a separate browser tab in some implementations. Multiple groups of one or more websites each having a different name can be created and tracked on the computing device and the user can provide voice or other input (e.g., physical interaction, sensed gesture, etc.) to select a particular group by name and open the websites in the group.

The digital assistant may be further configured to utilize text-to-speech capabilities to provide a screen-less and/or hands-free user experience for the website content. Once websites in a group are opened on the browser, the user can interact with the digital assistant to have content read aloud, using the digital assistant's synthesized voice, so that the user can consume website content as an auditory experience without having to interact with the computing device's display and graphical user interface. This feature can help to improve the user-machine interface by enabling website content to be consumed by the user without having to read from the computing device display screen. Such screens can often be small on many devices. In addition, scarce resources such as battery power can be conserved in the screen-less user experience by dimming or disabling the display during the auditory experience.

The monitored interactions and user behaviors can also be utilized to enable the browser to intelligently open websites from within a selected group. For example, a group may include 10 websites, but the user's browsing history shows a pattern in which some of the websites are rarely utilized. In addition to browsing history, the digital assistant can also apply other context data such as location, the user's schedule, and/or interactions/communications with contacts (e.g., friends, colleagues) when performing the intelligent opening. Thus, the browser can open the more frequently used websites and filter out the rarely used ones. Such intelligent loading improves the user experience to provide contextually-relevant information while minimizing distractions. The intelligent website opening also can improve computing device operations by reducing network bandwidth consumption, processor cycles, and memory utilization, for example, by suppressing downloading of website content that is not consumed.

The user can further interact with the digital assistant and/or the computing device UI to enable website content to be downloaded and cached for future consumption. For example, the digital assistant can apply context data that indicates that the user is going to be in the car to drive to work. The digital assistant can instruct the browser to download website content in the groups that the user typically consumes on the drive so that the downloading is performed while the computing device is on the user's home broadband network. That way, the relevant data is pre-fetched and websites in the group can be opened on the drive without having to employ a cellular data connection which can be costly and have limited bandwidth. The digital assistant can read website content from the groups aloud to the user so that the user can then consume content during the drive without the dangerous distraction of reading from the computing device display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIGS. 9, 10, and 11 show screen captures of illustrative graphical user interfaces (GUIs) that are exposed on a device by a digital assistant;

Like reference numerals indicate like elements in the drawings. Elements are not drawn to scale unless otherwise indicated.

DETAILED DESCRIPTION

Figure 1:
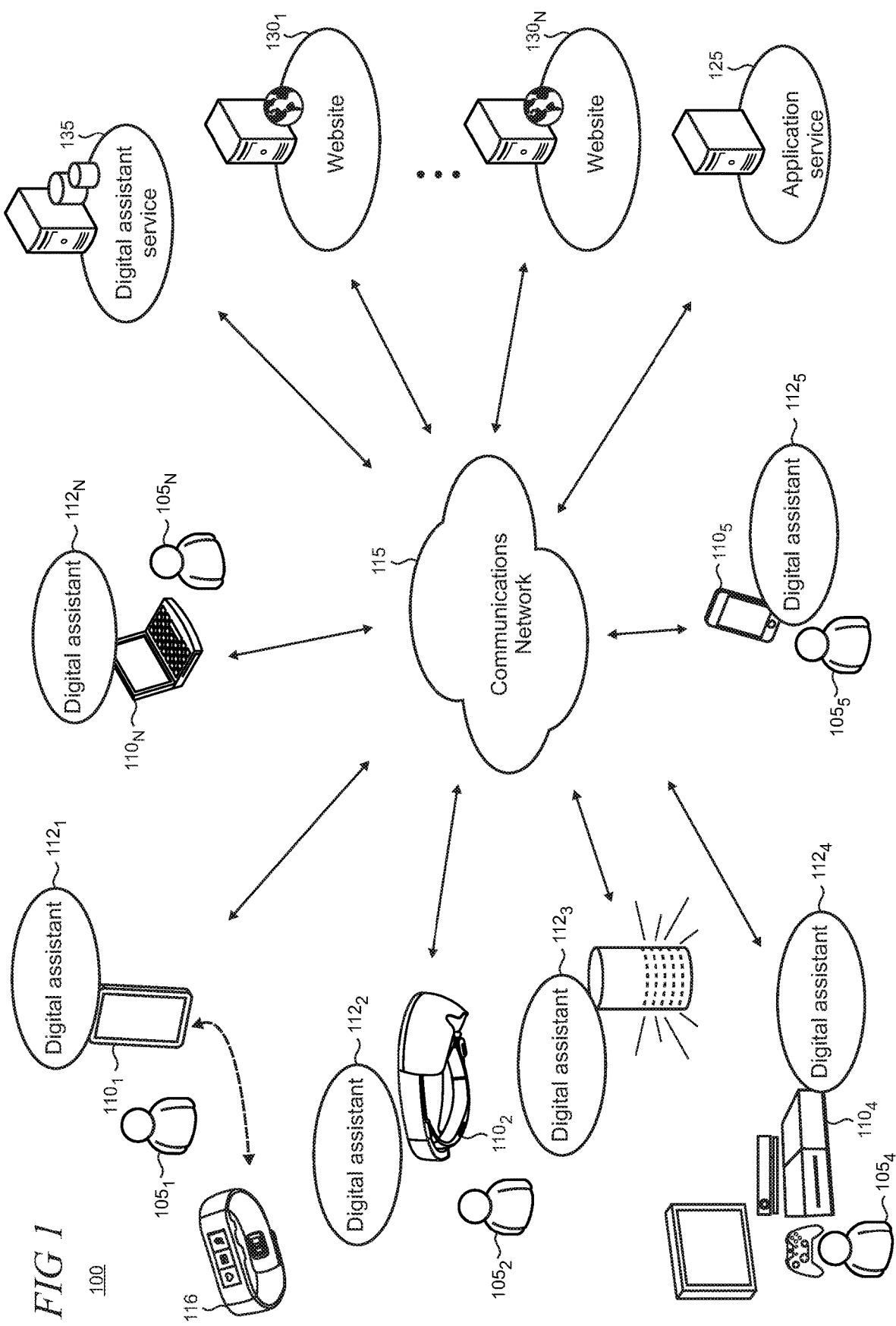
FIG. 1 shows an illustrative environment in which computing devices can communicate and interact with services and websites over a network.

FIG. 1 shows an illustrative environment 100 in which the same or different users 105 may employ various devices 110 that communicate over a communications network 115. Each device 110 may include an instance of an embedded digital assistant 112 or be coupled to another device that includes a digital assistant. The devices 110 can support voice telephony capabilities in some cases and typically support data-consuming applications such as Internet browsing and multimedia (e.g., music, video, etc.) consumption in addition to various other features. The devices 110 may include, for example, user equipment, mobile phones, cell phones, feature phones, tablet computers, and smartphones which users often employ to make and receive voice and/or multimedia (i.e., video) calls, engage in messaging (e.g., texting) and email communications, use applications and access services that employ data, browse the World Wide Web, and the like.

Other types of electronic devices may also be usable within the environment 100 including handheld computing devices, PDAs (personal digital assistants), portable media players, devices that use headsets and earphones (e.g., Bluetooth-compatible devices), phablet devices (i.e., combination smartphone/tablet devices), wearable computing devices such as head-mounted display (HMD) systems and smartwatches, navigation devices such as GPS (Global Positioning System) systems, laptop PCs (personal computers), smart speakers, IoT (Internet of Things) devices, smart appliances, connected car devices, smart home hubs and controllers, desktop computers, multimedia consoles, gaming systems, or the like. In the discussion that follows, the use of the term "device" is intended to cover all devices that are configured with an embedded digital assistant (or can connect to a device with a digital assistant), have communication capabilities, and are capable of connectivity to the communications network 115.

The various devices 110 in the environment 100 can support different features, functionalities, and capabilities (here referred to generally as "features"). Some of the features supported on a given device can be similar to those supported on others, while other features may be unique to a given device. The degree of overlap and/or distinctiveness among features supported on the various devices 110 can vary by implementation. For example, some devices 110 can support touch controls, gesture recognition, and voice commands, while others may enable a more limited user interface. Some devices may support video consumption and Internet browsing, while other devices may support more limited media handling and network interface features.

Accessory devices 116, such as wristbands and other wearable computing devices may also be present in the environment 100. Such accessory device 116 typically is adapted to interoperate with a coupled device 110 using a short range communication protocol like Bluetooth to support functions such as monitoring of the wearer's physiology (e.g., heart rate, steps taken, calories burned, etc.) and environmental conditions (temperature, humidity, ultra-violet (UV) levels, etc.), and surfacing notifications from the coupled device 110. Some accessory devices can be configured to work on a standalone basis (i.e., without relying on a coupled device 110 for functionality such as Internet connectivity) as wearable computing devices that may support an operating system and applications.

The devices 110 can typically utilize the network 115 in order to access and/or implement various user experiences. The network can include any of a variety of network types and network infrastructure in various combinations or subcombinations including cellular networks, satellite networks, IP (Internet-Protocol) networks such as Wi-Fi under IEEE 802.11 and Ethernet networks under IEEE 802.3, a public switched telephone network (PSTN), and/or short range networks such as Bluetooth® networks. The network infrastructure can be supported, for example, by mobile operators, enterprises, Internet service providers (ISPs), telephone service providers, data service providers, and the like.

The network 115 may utilize portions of the Internet (not shown) or include interfaces that support a connection to the Internet so that the devices 110 can access content and render user experiences provided by various remote or cloud-based application services 125 and websites 130. The application services 125 and websites 130 can support a diversity of features, services, and user experiences such as social networking, mapping, news and information, entertainment, travel, productivity, finance, etc. A digital assistant service 135 is also present in the computing environment 100, as described in more detail below.

Figure 2:
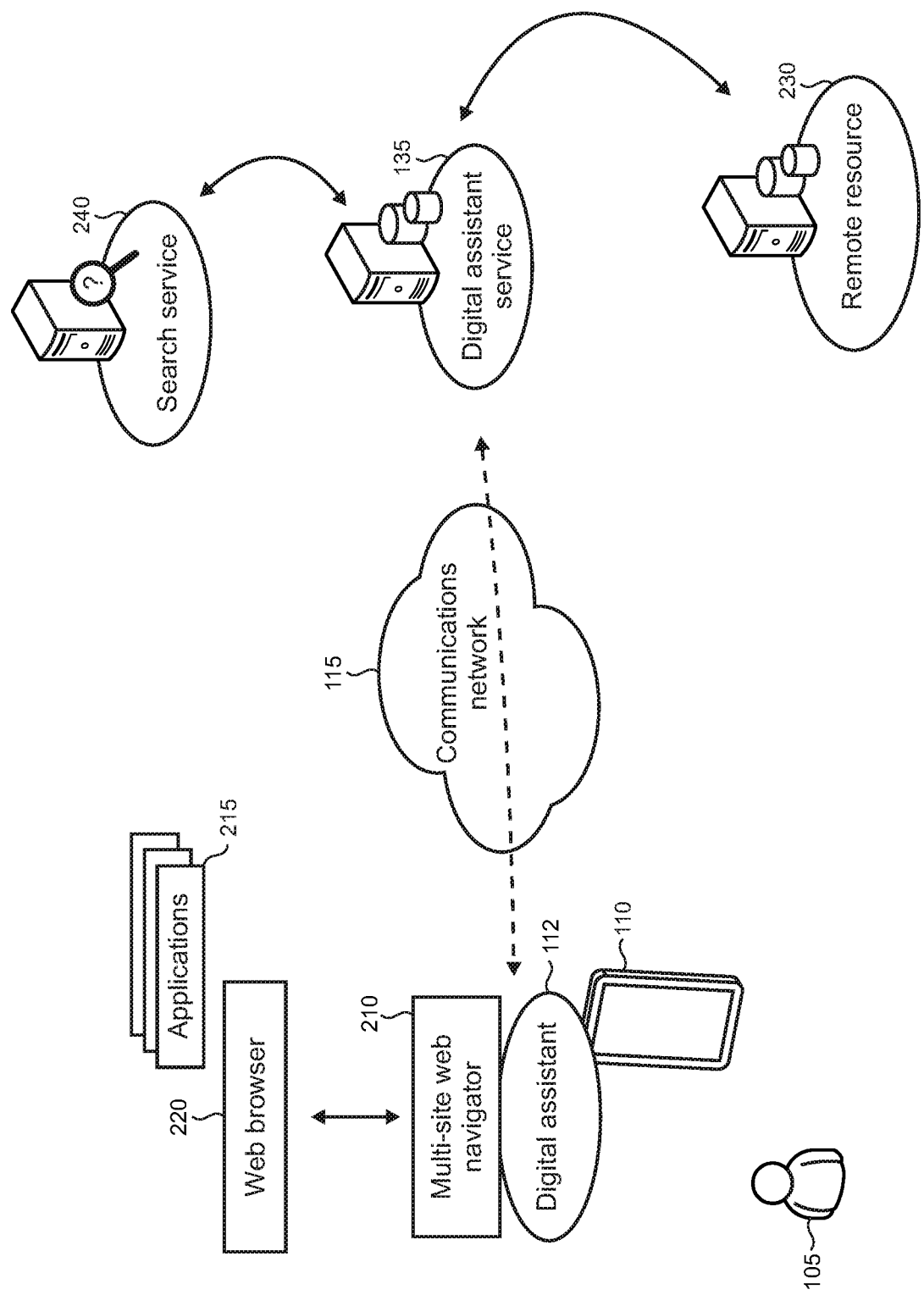
FIG. 2 shows an illustrative locally instantiated digital assistant that supports a multi-site web navigator interacting with a remote digital assistant service.

As shown in FIG. 2, a device 110 can include local components such as a web browser 220 and applications 215 that can respectively facilitate interaction with one or more websites 130 (FIG. 1) and remote application services 125. For example, in some use scenarios, a user 105 may launch a locally executing application that communicates over the network 115 to an application service 125 (FIG. 1) to retrieve data and obtain services to enable various features and functions, provide information, and/or support user experiences that can be supported on various ones of the user interfaces on a local device 110 such as graphical user interfaces (GUIs), natural language interfaces, and audio interfaces. In some use scenarios and/or at different times, an application 215 may operate locally on the device without needing to interface with a remote service.

In this illustrative example, the local digital assistant 112 interoperates with a multi-site web navigator 210 that is configured to interact with browser 220 and/or the applications 215 in some implementations, as described in more detail below in the text accompanying FIGS. 3 and 4. The digital assistant 112 can typically interact with the remote digital assistant service 135. The split of functionality between the local digital assistant 112 and service 135 can be set to meet the needs of a given implementation.

The utilization of a client-server architecture to implement the digital assistant 112 in this implementation is a design choice and other architectures may also be utilized. For example, the digital assistant can be executed using fully locally instantiated components in some cases, or executed completely remotely in other cases. In some implementations, the digital assistant can be arranged as a standalone component that provides features and/or services without interacting with a remote resource or service (aside from periodic updates, and the like). The digital assistant service 135 may interoperate with a search service 240 and other remote resources 230 to provide digital assistant functionality as described in more detail in the text accompany FIGS. 8-14 below.

Figure 3:
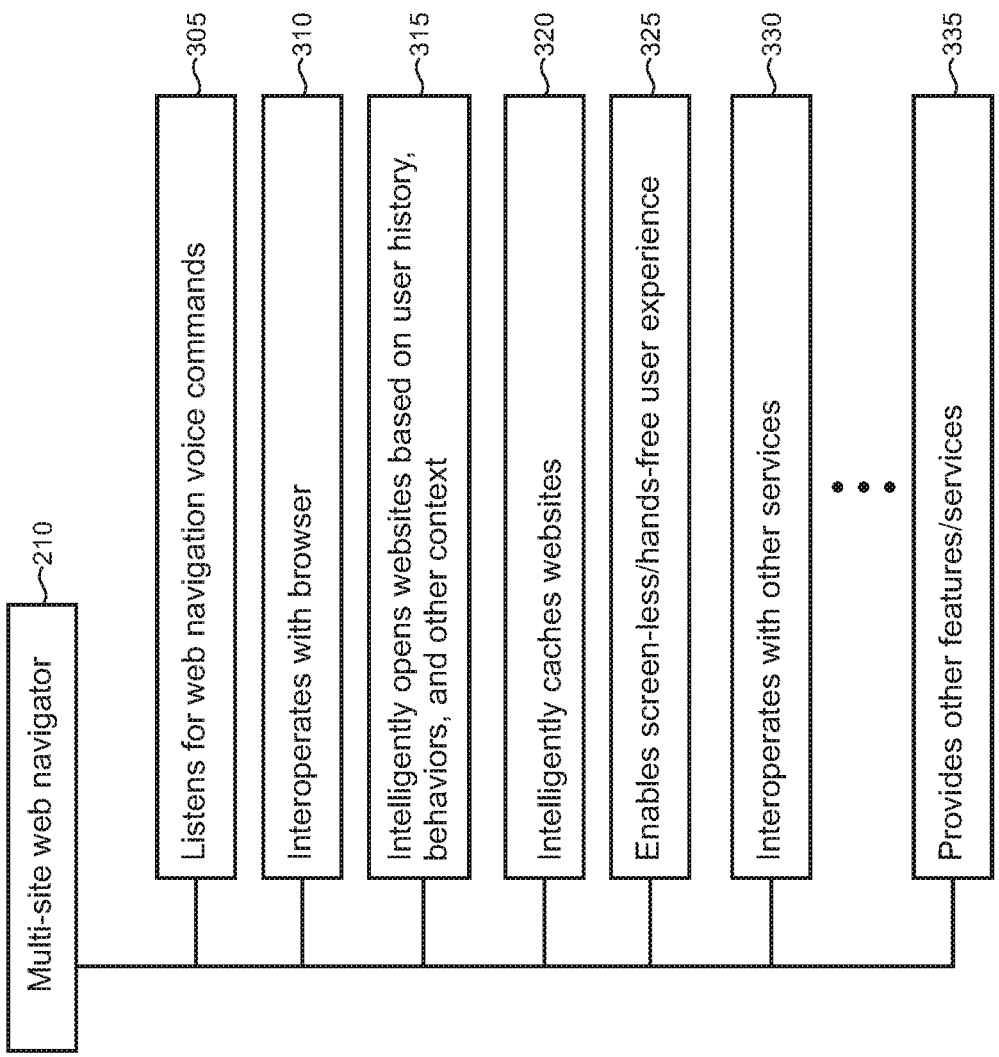
FIG. 3 shows an illustrative taxonomy of functionalities supported by a multi-site web navigator.
Figure 5:
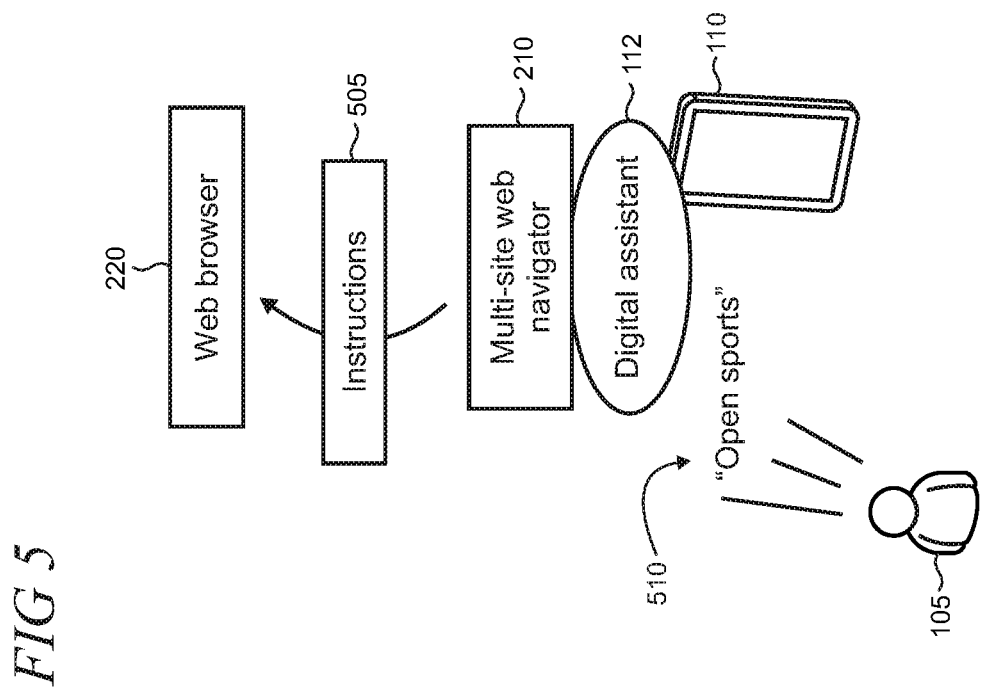
FIG. 5 shows an illustrative interaction between the multi-site web navigator supported by the digital assistant and a web browser in response to a received voice command.

FIG. 3 shows an illustrative taxonomy 300 of functionalities that may be utilized in a given implementation of the present hands-free multi-site web navigation and consumption. The functionalities are illustrative and not exhaustive and not every functionality needs to be supported in every implementation. The functionalities 300 include multi-site web navigator 210 operating with the digital assistant 112 to listen to web navigation voice commands from the user at a natural language interface, as indicated by reference numeral 305. The multi-site web navigator is also configured to interoperate with the browser (310) as shown in FIG. 5 and described in the accompanying text.

The multi-site web navigator 210 may be configured to filter websites in a group using a variety of criteria to enable intelligent opening of particular websites in a given group (315). For example, the digital assistant 112 can collect and analyze available context including user browsing history and interactions with the computing device to filter some websites in a group from being opened. The user can also explicitly control filtering through a UI and/or with interactions with the digital assistant, for example to set preferences, highlight or skip certain website content, and/or select the applicable context for particular website groups (e.g., open a music group of websites when the user is driving, open a news group of websites before the user goes to sleep, suppress opening of a favorites group when the user is on a phone call), and the like.

The user can also implicitly control website filtering by enabling the digital assistant 112 to monitor user interactions with applications on the various devices 110 (in which such monitoring is performed with notice to the user and user consent). The monitored interactions can enable the digital assistant to learn the user's preferences and browsing patterns when interacting with websites. For example, the digital assistant may observe a recurring pattern in which the user visits certain websites when the user is engaged in particular activities or during particular times of the day. The digital assistant can thus suggest to the user that those websites be grouped, named, and/or opened in the future upon the occurrence of similar contexts.

Feedback from the user on the appropriateness or relevance of the suggestions and recommendations can be collected by the digital assistant service 135 (or another service) and be used to refine the methodology utilized to monitor the interactions and make suggestions. In some implementations, feedback can be crowd-sourced across a universe of computing device users and various techniques such as collaborative filtering and the like may be applied to generate recommendations for groups that the digital assistant can surface to the user.

The multi-site web navigator 210 may be configured to intelligently cache content from websites in one or more groups to optimize, for example, the user experience and resource utilization such as network connectivity, bandwidth, processing capabilities, and memory, as indicated by reference numeral 320 in FIG. 3. In some implementations, the caching can utilize monitored context and other data to further improve computing device operation. Caching can be utilized to pre-fetch website content in groups that the digital assistant determines that the user will likely wish to consume.

For example, the digital assistant 112 can interact with the user's calendar and scheduling application to determine that the user is going to the gym for a workout later in the day. The digital assistant can further examine the user's past browsing history to determine, for example, that the user often employs a smartphone device while driving to consume news from a group of news websites. The digital assistant can then instruct the browser to pre-fetch and cache website content on the user's computing device while the device is on the user's home network. Such caching can reduce or eliminate the utilization of a cellular data connection during the drive which can be subject, for example, to lower bandwidth and quality of service (QoS) and which may be more expensive relative to the user's home network.

As shown by reference numeral 325, the multi-site web navigator 210 can be configured to support a screen-less and hands-free user experience. Continuing with the above example, the digital assistant 112 can read aloud the cached website content to the user during the drive to the gym to reduce distractions associated with reading content from the computing device's display screen, and thus support a more optimal user experience. In some implementations, the controls may be exposed to the user on the UI to explicitly select particular groups and/or websites in a group to be cached. Alternatively, the user can interact with the digital assistant using the natural language or other interfaces to explicitly have website content cached. For example, the user may say to the digital assistant "please download the sports group websites before I head off to work this morning."

The multi-site web navigator 210 can also be configured to interoperate with other services (330) and/or provide other features and services (335) as may be needed to suit the requirements of a particular implementation.

Figure 4:
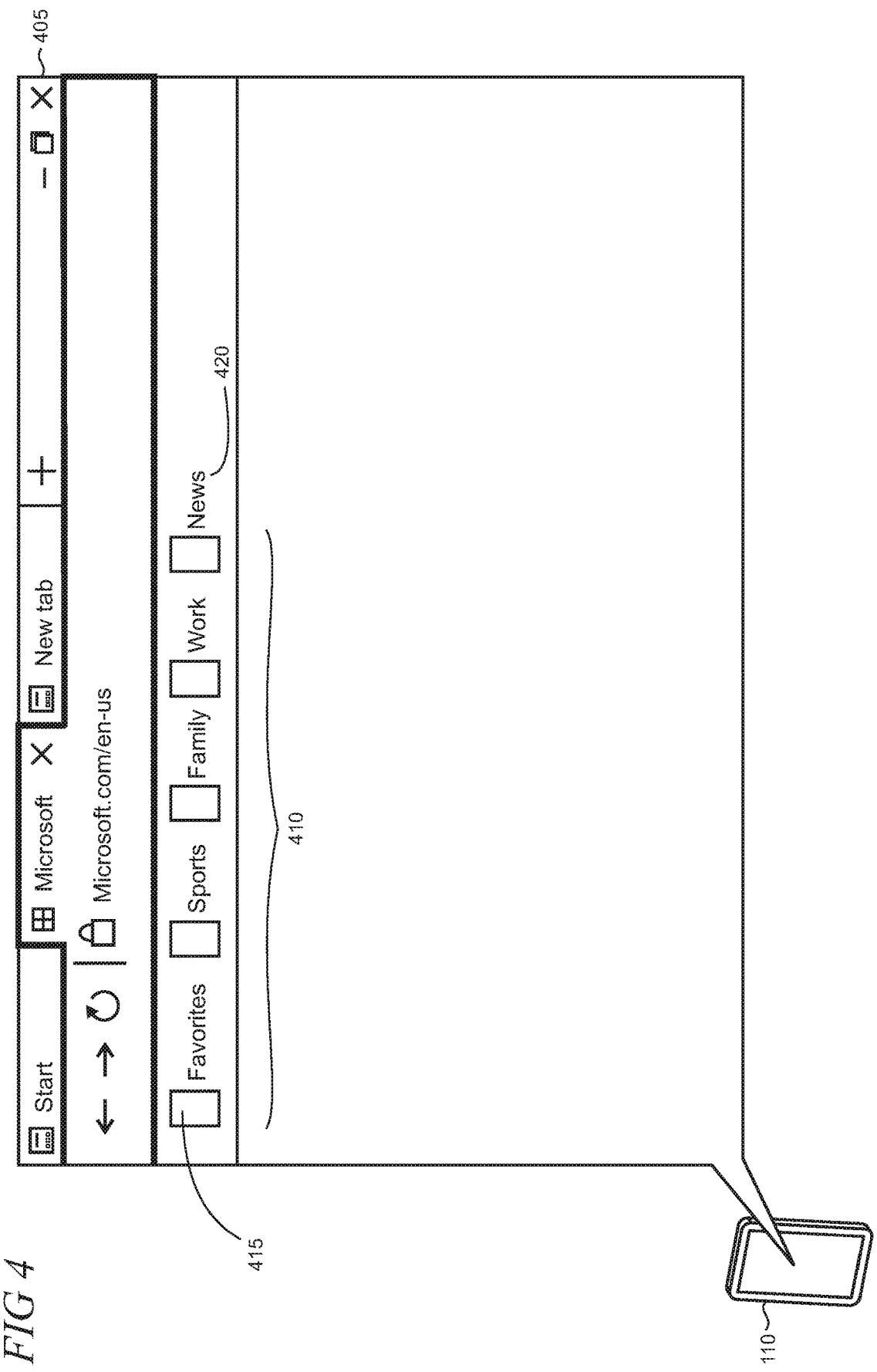
FIG. 4 shows a screenshot of an illustrative user interface (UI) that supports the creation and tracking of groups of websites.

FIG. 4 shows a screenshot of an illustrative user interface (UI) 405 on a computing device 110 that supports the creation and tracking of groups of websites. In this example, the UI 405 is supported by the browser 220 (FIG. 2) that executes on a computing device 110. The UI is configured to enable the user to select websites for inclusion in a group and give the group a name. The user can interact with the browser UI using conventional methods (e.g., using a mouse and keyboard), or alternatively engage with the digital assistant to select websites and name groups using voice and/or other inputs.

In this illustrative example, the user has created and named five website groups including, as shown, "favorites,"

"sports," "family," "work," and "news" (collectively indicated by reference numeral 410). Each group can include one or more websites that the user has selected. Typically, the groups can be graphically represented using icons 415 and/or text 420 and each group functions like a folder in which the websites are organized. The user, for example, can see the website members of the group by clicking on the icon or interacting with the digital assistant to review group membership (i.e., the digital assistant can read the names of the member websites to the user aloud).

In alternative implementations, the digital assistant may be configured to utilize context to create and name groups automatically, or make recommendations for website groups to the user. For example, if monitored interactions and user behaviors show that the user has a pattern of visiting websites that deal with camping and recreation, the digital assistant can suggest that those websites be included in a group named "camping." The digital assistant can receive feedback on the suggested group from the user and modify the group membership as appropriate. As the user visits new camping websites, the digital assistant can suggest the new sites be added to the camping group as appropriate, based for example, on the user's frequency of visits.

FIG. 5 shows an illustrative interaction between the multi-site web navigator 210 supported by the digital assistant 112 and a web browser in response to a received voice command 510. For example, in the UI 405 (FIG. 4) the user has created a group of one or more websites named "sports." Using the single voice command 510, the user can cause each of the websites in the sports group to be opened in the browser. The multi-site web navigator 210 can register a listener or other suitable functionality with the digital assistant 112. When a predetermined voice command is heard by the listener, the multi-site web navigator passes instructions 505 to the browser 220 to perform an opening operation.

The voice command utilized to open a website group can vary according to the requirements of a given implementation. In this example, the voice command uses the syntax "open <group name>." In alternative implementations, the digital assistant may be configured to be responsive to other user inputs beyond voice to open a group of websites. For example, the user can enter a text string or make a gesture on a suitably configured UI.

The instructions can be configured to implement the intelligent opening in which website filtering is performed, as described above. That is, the filtering logic can be instantiated in the multi-site web navigator 210. Alternatively, the filtering logic can be instantiated in the web browser 220, or shared between the browser and the navigator. The digital assistant 112 can also be utilized to implement the intelligent opening, or the filtering logic can be instantiated in another component on the computing device 110 or be shared across components. In some implementations, remote processing (e.g., at the digital assistant service 135) may be used in whole or part to implement the filtering logic for the intelligent opening feature.

Figure 6:
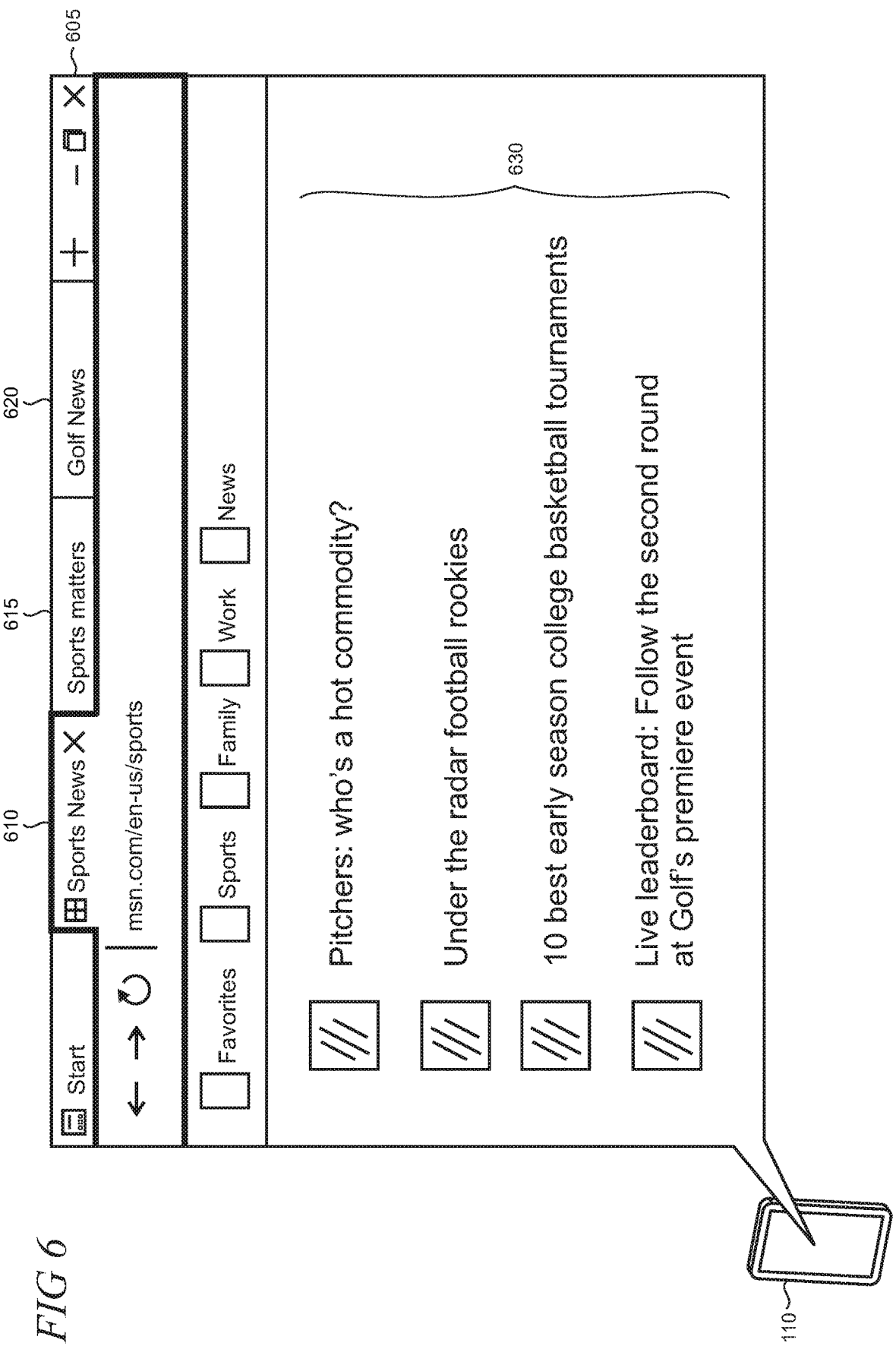
FIG. 6 shows a screenshot of an illustrative user interface (UI) in which the browser has opened multiple websites in a group in individual tabs in response to a received voice command.

In typical implementations, each website is opened in a separate tab on the browser, as shown in the UI 605 in FIG. 6, but other constructs may also be utilized according to the features and capabilities of a given browser design. For example, websites in the groups can be opened in separate browser windows if tabs are not supported. In this example, the "sports" group includes three websites including "Sports News," "Sports Matters," and "Golf News" each of which are opened in respective tabs 610, 615, and 620 on the browser UI 605, as shown. In the currently active tab 610, the "Sports News" website provides various content including news stories, as collectively indicated by reference numeral 630.

Figure 7:
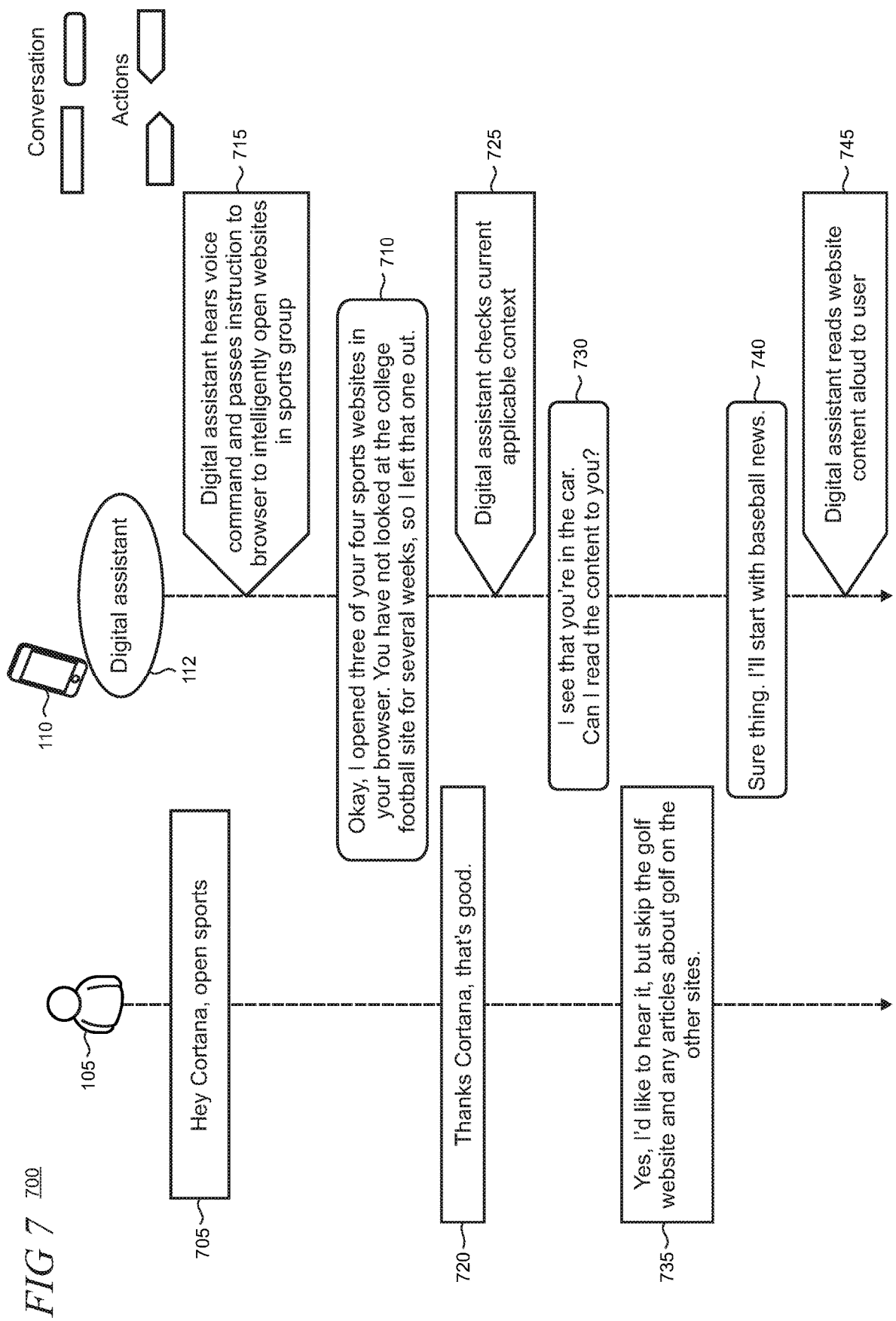
FIG. 7 shows a transcript of illustrative interactions between a computing device user and a digital assistant over a natural language interface.

FIG. 7 shows a transcript 700 of illustrative voice-based interactions between a user 105 and a digital assistant 112 operating on a computing device 110 over a natural language interface. As shown, the user 105 has voice-based interactions with a digital assistant 112 that is named "Cortana" in this illustrative example. The user's dialog is shown on the left-hand side of the drawing using rectangles (representatively indicated by reference numeral 705). The digital assistant's dialog is shown on the right-hand side using rounded rectangles (representatively indicated by reference numeral 710). Actions are shown using flags (representatively indicated by reference numeral 715).

As shown in block 705, the user asks the digital assistant to open all the websites in a group using the single voice input "open sports." At flag 715, in response to the user voice input to the natural language interface, the digital assistant 112 and multi-site web navigator 210 can provide suitable instructions to the browser 220 to intelligently load and open websites in the selected group. In this illustrative example, the monitored context, including the user's browsing history, indicates that the user has typically not consumed content from one particular website in the group. The intelligent opening, accordingly, can exclude that website based on the user's past behaviors.

In some implementations, the intelligent opening can be performed transparently to the user. In this example, the digital assistant 112 informs the user 105 of the excluded website at block 710. Such explicit notice can trigger the receipt of feedback from the user which may be used to improve the accuracy of the intelligent opening in subsequent interactions. The user provides affirmation for the intelligent opening at block 720.

At flag 725, the digital assistant 112 checks current applicable context to determine that the user is driving a car. For example, the digital assistant can interface with a computing device sensor such as an accelerometer to detect motion, examine the user's scheduling application to determine that the user is heading to the gym, or utilize other monitored context (as described in the description below accompanying FIG. 8) to make such determination. The digital assistant offers to read the filtered websites in the sports group aloud to the user at block 730.

At blocks 735 and 740, the user interacts with the digital assistant to select certain content for consumption while skipping other content. At flag 745, the digital assistant reads website content aloud, in the digital assistant's native voice, to the user using text-to-speech conversion. The user can continue to interact with the digital assistant (not shown in FIG. 7) through the natural language interface to select content, find content, and direct how the content is read aloud. For example, the user may say "skip to the next article," "repeat the last sentence," "read faster," "slow down," "read the hockey news," and the like.

Figure 8:
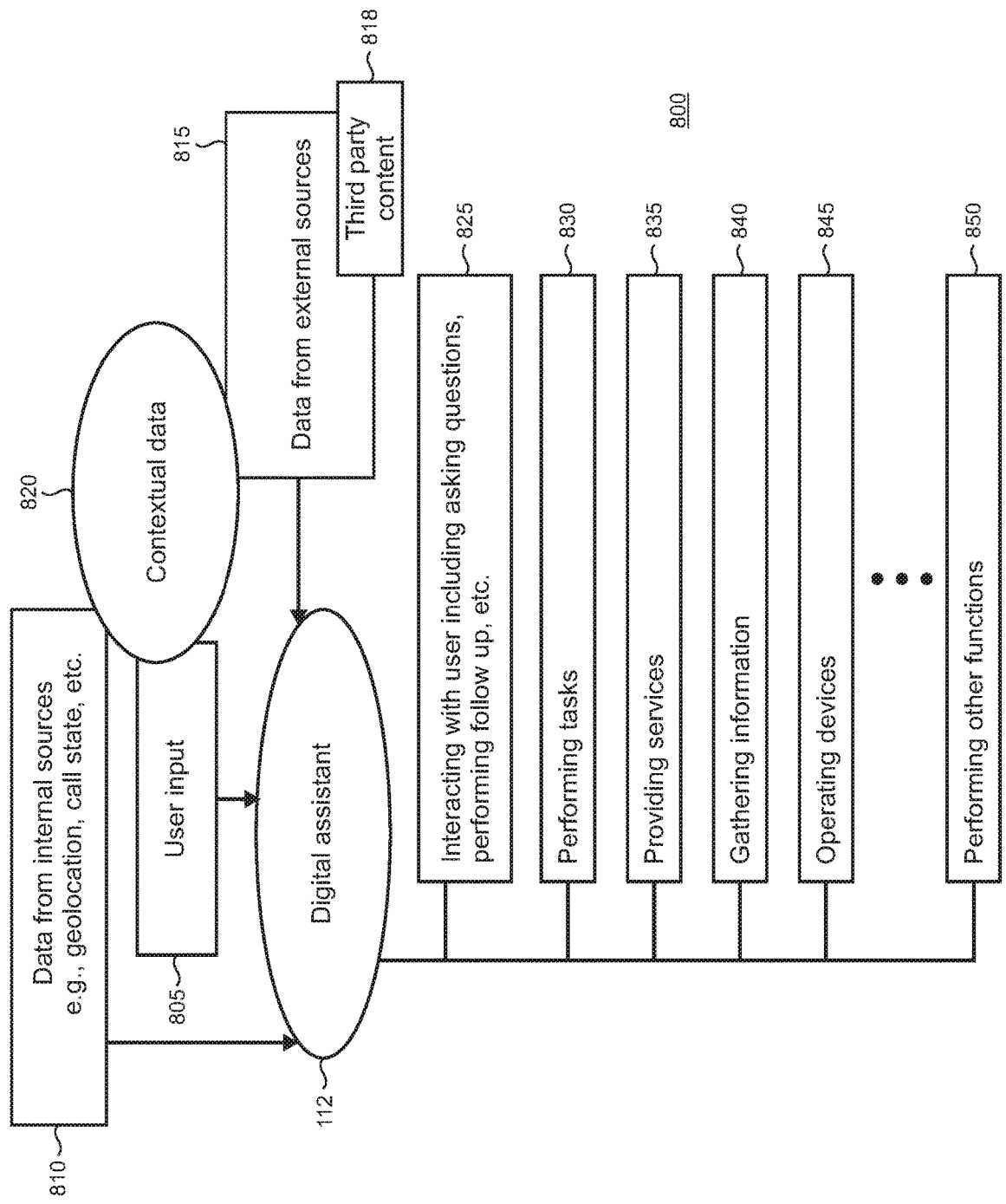
FIG. 8 shows illustrative inputs to a digital assistant and an illustrative taxonomy of general functions that may be performed by a digital assistant.

Turning now to various implementation details, FIG. 8 shows an illustrative taxonomy of functions 800 that may typically be supported by the digital assistant 112 either natively or in combination with an application 215 (FIG. 2). Inputs to the digital assistant 112 typically can include user input 805, data from internal sources 810, and data from external sources 815 which can include third-party content 818. For example, data from internal sources 810 could include the current location of the device 110 that is reported by a GPS (Global Positioning System) component on the device, or some other location-aware component. The externally sourced data 815 includes data provided, for example, by external systems, databases, services, and the like.

The various inputs can be used alone or in various combinations to enable the digital assistant 112 to utilize contextual data 820 when it operates. Contextual data can include, for example, time/date, the user's location, language, schedule, applications installed on the device, the user's preferences, the user's behaviors (in which such behaviors may be monitored/tracked with notice to the user and the user's consent), stored contacts (including, in some cases, links to a local user's or remote user's social graph such as those maintained by external social networking services), call history, messaging history, browsing history, device type, device capabilities, communication network type and/or features/functionalities provided therein, mobile data plan restrictions/limitations, data associated with other parties to a communication (e.g., their schedules, preferences, etc.), and the like.

As shown, the functions 800 illustratively include interacting with the user 825 (through a natural language user interface and other graphical interfaces, for example); performing tasks 830 (e.g., making note of appointments in the user's calendar, sending messages and emails, etc.); providing services 835 (e.g., answering questions from the user, mapping directions to a destination, setting alarms, forwarding notifications, reading emails, news, blogs, etc.); gathering information 840 (e.g., finding information requested by the user about a book or movie, locating the nearest Italian restaurant, etc.); operating devices 845 (e.g., setting preferences, adjusting screen brightness, turning wireless connections such as Wi-Fi and Bluetooth on and off, communicating with other devices, controlling smart appliances, etc.); and performing various other functions 850. The list of functions 800 is not intended to be exhaustive and other functions may be provided by the digital assistant 112 and/or applications as may be needed for a particular implementation of the present hands-free multi-site web navigation and consumption.

The digital assistant 112 can be exposed to the user 105 through a UI that is displayed on a device 110. For example, FIGS. 9, 10, and 11 show various illustrative screen captures of UIs that may be utilized in the present hands-free multi-site web navigation and consumption. It is emphasized that the particular UIs displayed in the drawings can vary from what is shown according to the needs of a particular implementation. UI 900 in FIG. 9 shows the digital assistant represented by a tile 905 that is displayed along with tiles representing other applications or user experiences on a start screen of a device. The digital assistant may also be configured to be launched from any location within any UI on the device, or from within any current user experience. For example, the user can be on a phone call, browsing the web, watching a video, or listening to music, and simultaneously launch the digital assistant from within any of those experiences. In some cases the digital assistant can be launched through manipulation of a physical or virtual user control, and/or by voice command and/or gesture in other cases.

When the user invokes the digital assistant, for example, by touching the tile 905 or by invoking a voice command or gesture, a UI 1000 shown in FIG. 10 is displayed on the device 110 that includes a text string 1005 that asks the user if something is needed. In alternative implementations, text to voice translation can be employed so that an audio message can be played in place of, or to supplement the text string 1005. As shown, the UI includes a box 1010 that is configured for showing a textual representation of a received voice command or other user input.

One or more graphic objects 1015 can be displayed on the UI 1000 to represent the digital assistant to the user. The graphic object 1015 in this example is a circular shape that can be animated so that, for example, it changes its shape, color, transparency, motion, or appearance as the digital assistant performs tasks, provides information, interacts with the user, etc.

As shown in the UI 1100 in FIG. 11, the user has input the string "open sports" 1105 into the box 1110 using, for example, keypad input or voice command. In response to the input, the digital assistant can launch an email application on the device. Thus, for example, when the user is on a phone call and the remote party asks "have you read the email I sent you yet?" the user can ask the digital assistant to open the email from the remote party and read it back. The digital assistant can maintain awareness of call state and other context to determine the identity of the remote party and can thus locate the email of interest for the user.

Figure 12:
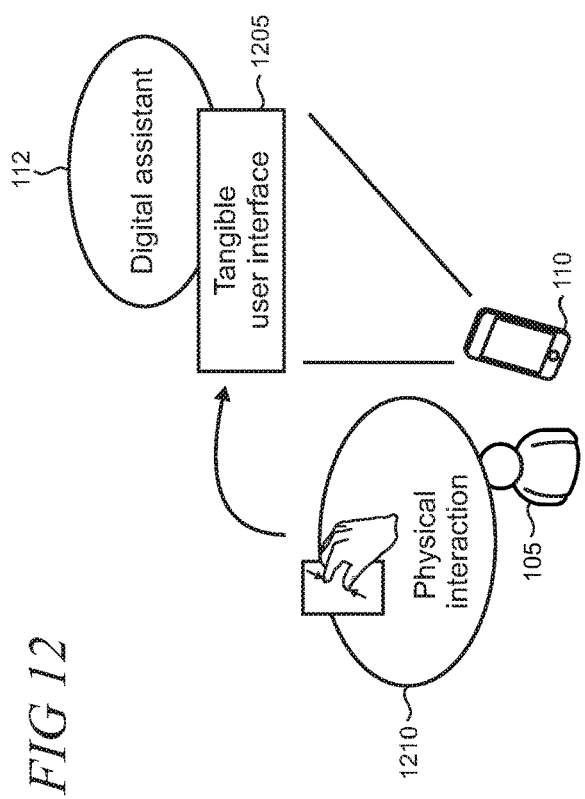

A user can typically interact with the digital assistant 112 in a number of ways depending on the features and functionalities supported by a given device 110. For example, as shown in FIG. 12, the digital assistant 112 may expose a tangible user interface 1205 that enables the user 105 to employ physical interactions 1210 in support of user experiences on the device 110. Such physical interactions can include manipulation of physical and/or virtual controls such as buttons, menus, keyboards, etc., using touch-based inputs like tapping, flicking, dragging, etc. on a touchscreen, and the like.

Figure 13:
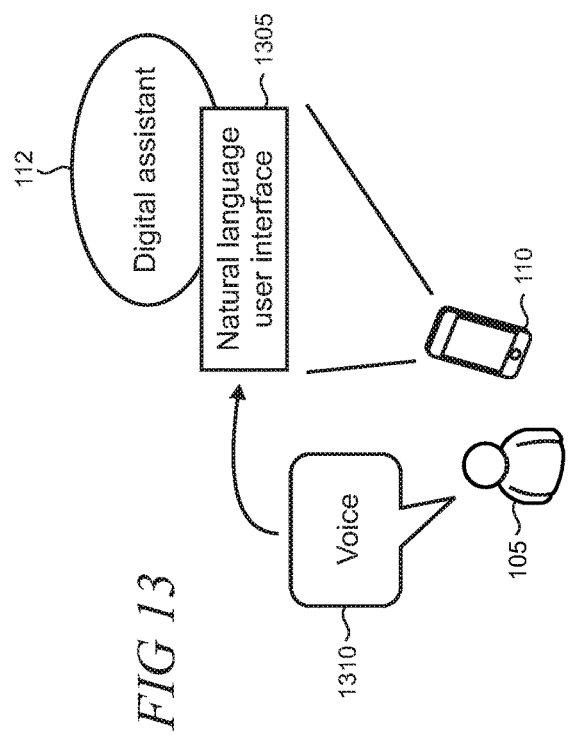

In some implementations, the digital assistant 112 may expose a natural language user interface 1305 shown in FIG. 13, or alternatively a voice command-based user interface (not shown), with which the user employs voice 1310 to provide various inputs to the device 110.

Figure 14:
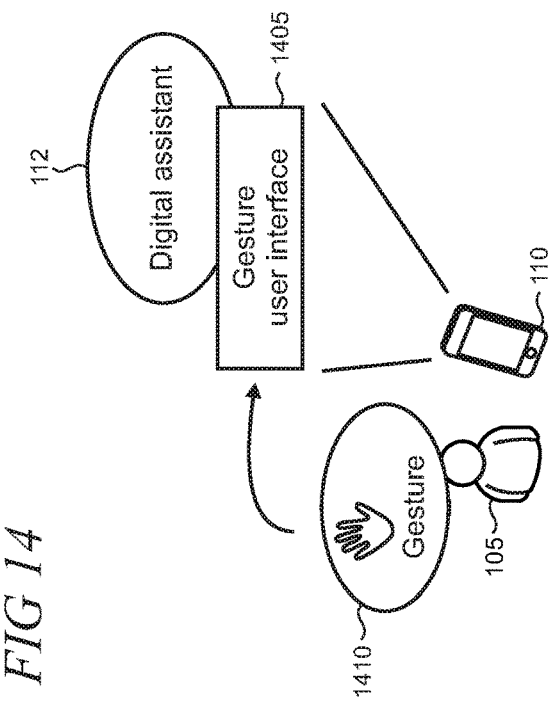
FIGS. 12, 13, and 14 show illustrative interfaces between a user and a digital assistant.

In other implementations, the digital assistant 112 may expose a gesture user interface 1405 shown in FIG. 14 with which the user 105 employs gestures 1410 to provide inputs to the device 110. It is noted that in some cases, combinations of user interfaces may be utilized where the user may employ, for example, both voice and physical inputs to interact with the digital assistant 112 and the device 110. The user gestures can be sensed using various techniques such as optical sensing, touch sensing, proximity sensing, and the like.

Figure 15:
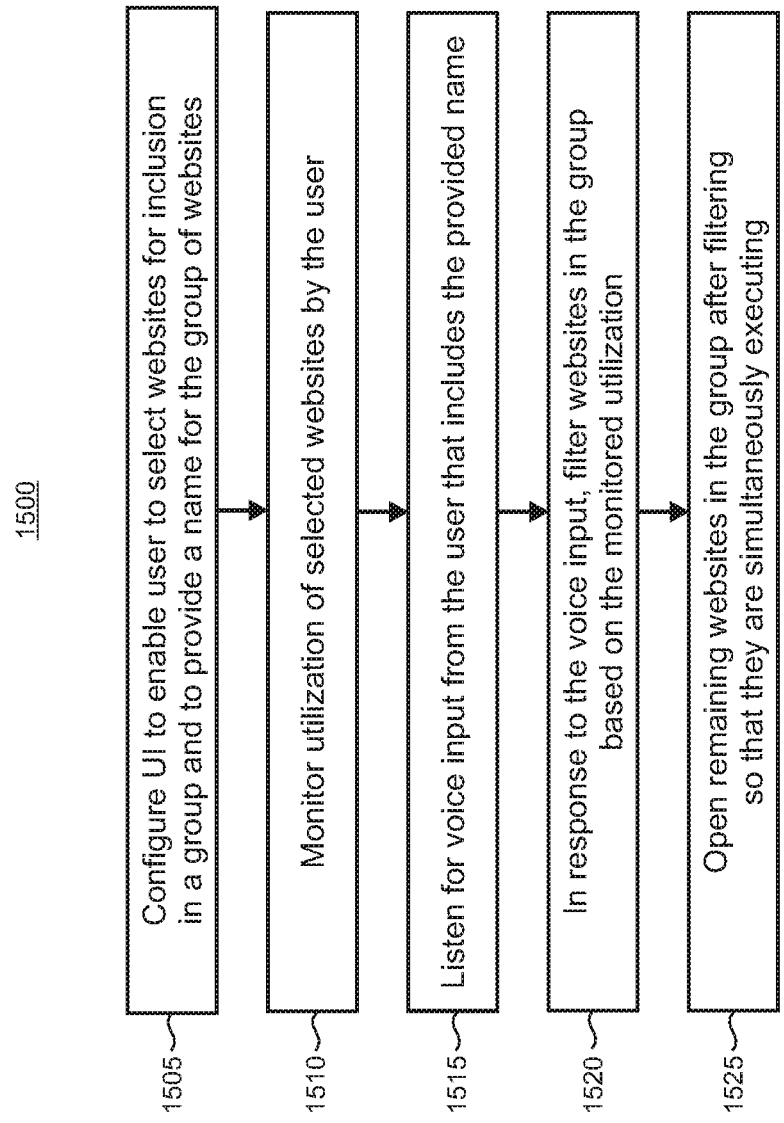
FIGS. 15, 16, and 17 show illustrative methods that may be performed when implementing the present hands-free multi-site web navigation and consumption.

FIG. 15 shows a flowchart of an illustrative method 1500 that may be performed on a computing device (e.g., device 110 in FIG. 1). Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

At step 1505, a UI is configured to enable a computing device user to select websites for inclusion in a group, and to provide a name for the group of websites. At step 1510, the user's utilization of the selected websites is monitored (typically with notice to the user and user consent). At step 1515, voice inputs at a natural language interface are listened for, in which the voice input includes the name provided by the user.

At step 1520, in response to the voice input, websites in the group are filtered based on the monitored utilization. As discussed above, the filtering may be performed to exclude some websites from being opened, such as those which are not contextually relevant, are not regularly consumed by the user, etc. At step 1525, the websites that remain after filtering are opened so that they are simultaneously executing. For example, each of the filtered websites may be opened in a separate tab in the web browser.

Figure 16:
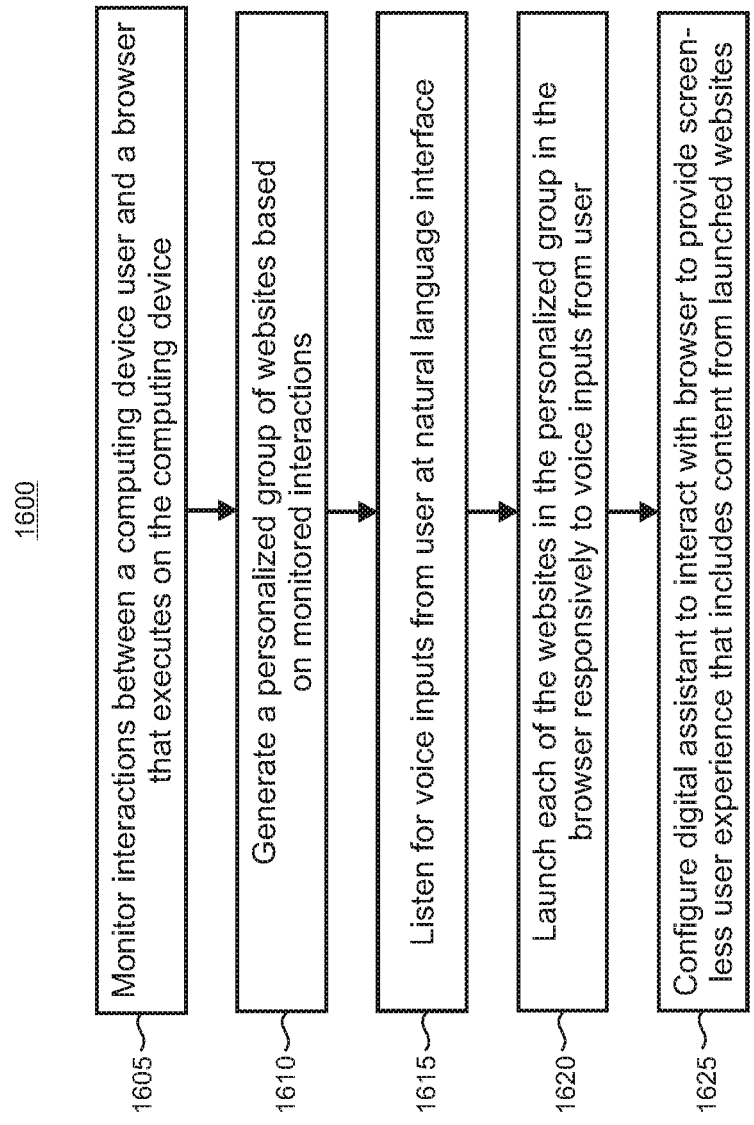

FIG. 16 is a flowchart of an illustrative method 1600 that may be implemented on a computing device (e.g., device 110 in FIG. 1). At step 1605, interactions between a computing device user and a browser executing on the device are monitored (typically with notice to the user and user consent). At step 1610, the monitored interactions may be used to generate a personalized group of websites for the user. At step 1615, the computing device is configured to listen for voice inputs to a natural language interface. For example, the multi-site web navigator 210 and/or the digital assistant 112 can register a suitable listener on the device to receive the inputs and responsively create and pass instructions to the browser 220.

At step 1620, based on the voice inputs, each of the websites in the personalized group are launched in the browser. In typical implementations, a single voice input can thus be utilized to simultaneously open multiple websites in the personalized group. At step 1625, the digital assistant may be configured to interact with the browser to provide a screen-less user experience that includes website content from the personalized group. Accordingly, the user can consume website content hands-free without the distraction of having to read from the computing device display screen.

Figure 17:
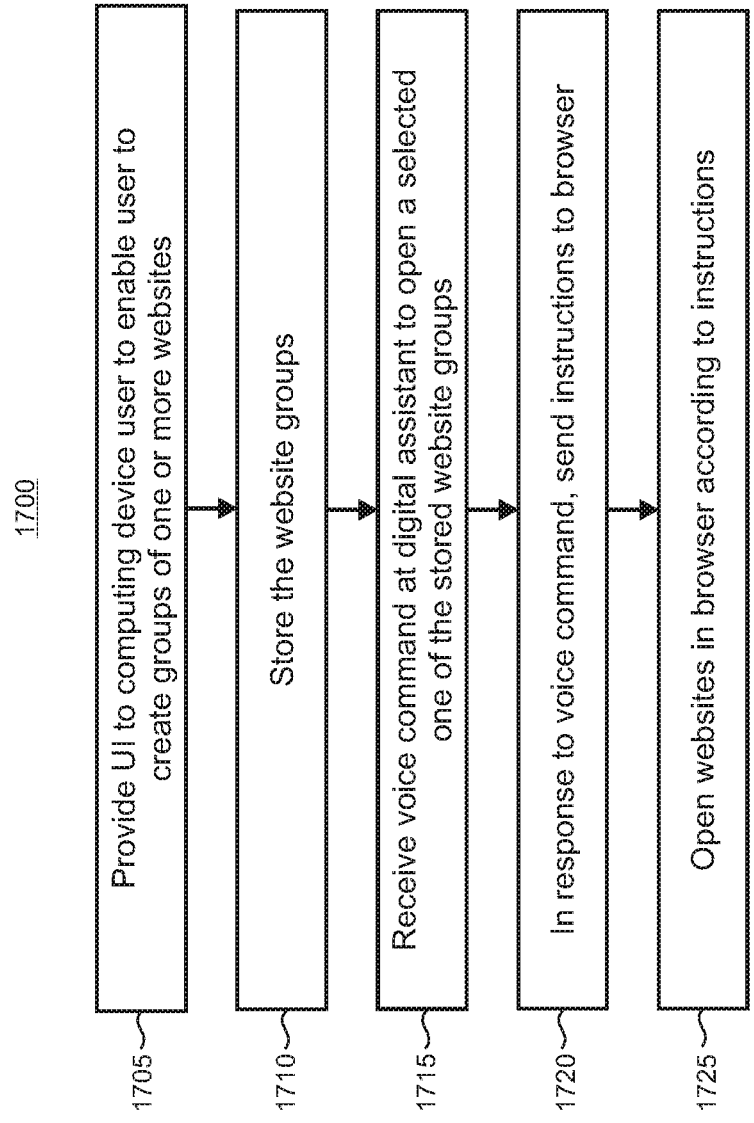

FIG. 17 shows an illustrative method 1700 that may be implemented on a computing device (e.g., device 110 in FIG. 1). At step 1705, a UI is provided to a computing device user to enable creation of groups of one or more websites. At step 1710, the created website groups are stored. The group storage can be implemented locally on the computing device, utilize remote or cloud-based storage, or a combination of local and remote storage.

At step 1715, the digital assistant 112 receives a voice command at a natural language interface to open a selected one of the stored groups of websites. At step 1720, in response to the received voice command, the digital assistant 112 sends a suitable instruction to the web browser 220. At step 1725, the browser opens the websites in response to the instructions. The instructions can implement intelligent opening in which some of the websites are filtered from the group so that only the remaining websites are presented on the browser UI. As noted above, such filtering can improve the quality of the user experience, preserve scarce computing resources, and improve the efficiency of computing device operations.

Figure 18:
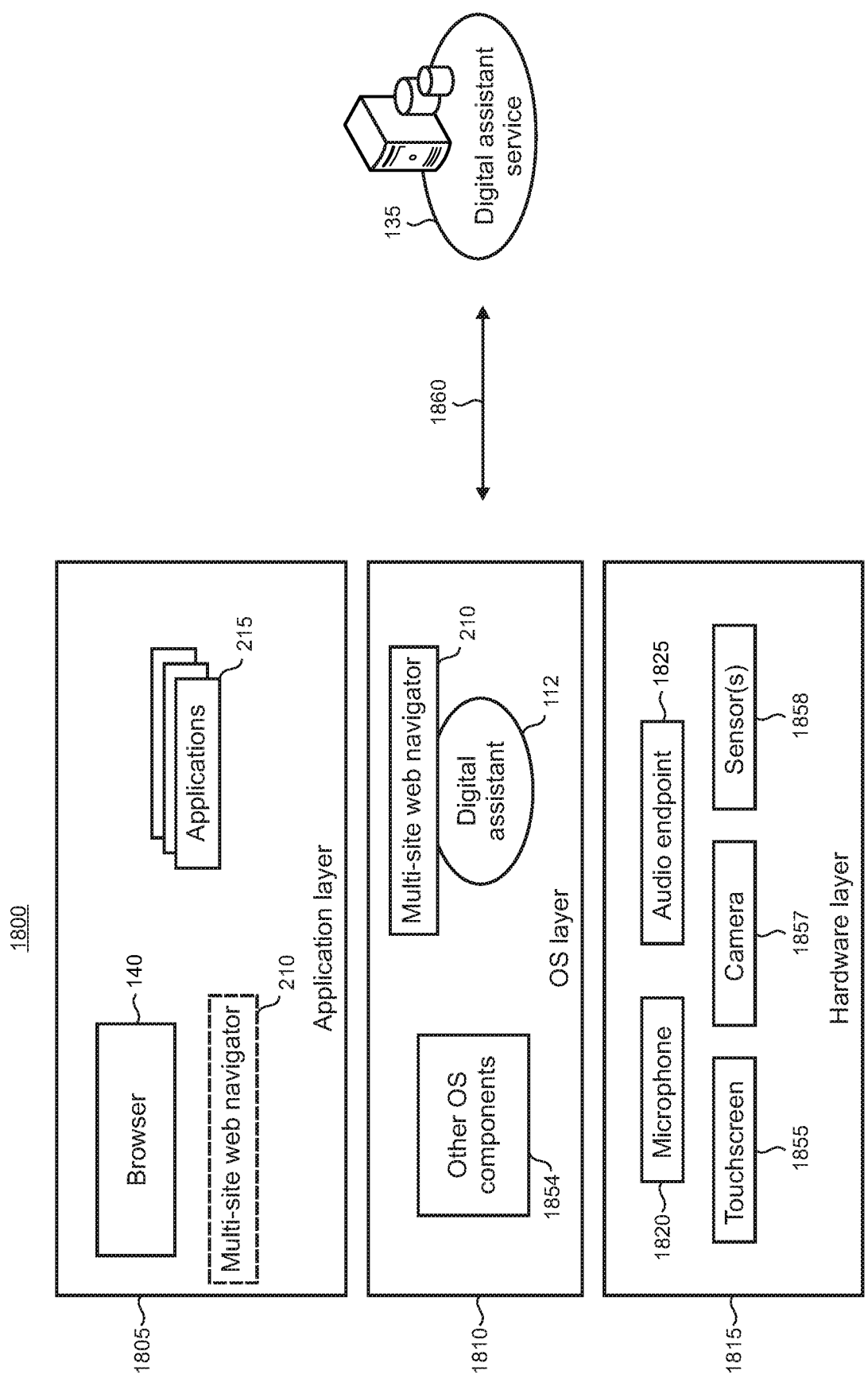
FIG. 18 shows an illustrative layered architecture.

FIG. 18 shows an illustrative layered architecture 1800 that may be instantiated on a given device 110. The architecture 1800 is typically implemented in software, although combinations of software, firmware, and/or hardware may also be utilized in some cases. The architecture 1800 is arranged in layers and includes an application layer 1805, an OS (operating system) layer 1810, and a hardware layer 1815. The hardware layer 1815 provides an abstraction of the various hardware used by the device 110 (e.g., input and output devices, networking and radio hardware, etc.) to the layers above it. In this illustrative example, the hardware layer supports a microphone 1820; an audio endpoint 1825 which may include, for example, the device's internal speaker, a wired or wireless headset/earpiece, external speaker/device, and the like; a touchscreen 1855; camera 1857; and one or more sensors 1858. The hardware layer components may facilitate implementation of UIs, including a natural language UI, supporting interactions between the user and digital assistant.

The application layer 1805 in this illustrative example supports various applications 215 (e.g., map application, email application, news application, etc.) and the web browser 220. The applications are often implemented using locally executing code. However in some cases, these applications can rely on services and/or remote code execution provided by remote servers or other computing platforms such as those supported by a service provider or other cloud-based resources. The multi-site web navigator 210 is shown here as an optional component that may be instantiated in the application layer 1805, as indicated by the dashed rectangle. It may be appreciated that the functionality provided by a given component in the application layer 1805 may be implemented, in whole or part, using components that are supported in either the OS or hardware layers.

The OS layer 1810 supports the digital assistant 112 and various other OS components 1854. The multi-site web navigator 210 can be instantiated in the OS layer as a component of the digital assistant 112 or as a separate component. The particular division of functionality between multi-site web navigator and digital assistant can typically be selected as a matter of design choice.

The digital assistant 112 can also interact with other suitable services (not shown) that are partially or fully instantiated locally on the device 110. For example, such services can apply local resources and implement local logic to support a variety of user experiences and features. In typical implementations, the digital assistant 112 can interact with the digital assistant service 135 as indicated by line 1860. That is, the digital assistant 112 in some implementations can partially utilize or fully utilize remote code execution supported at the services 135, or interact with other remote resources 230, search services 240 (FIG. 2), and/or other functionalities and services. In addition, it may utilize and/or interact with the other OS components 1854 (and/or other components that are instantiated in the other layers of the architecture 1800) as may be needed to implement the various features and functions described herein.

Figure 19:
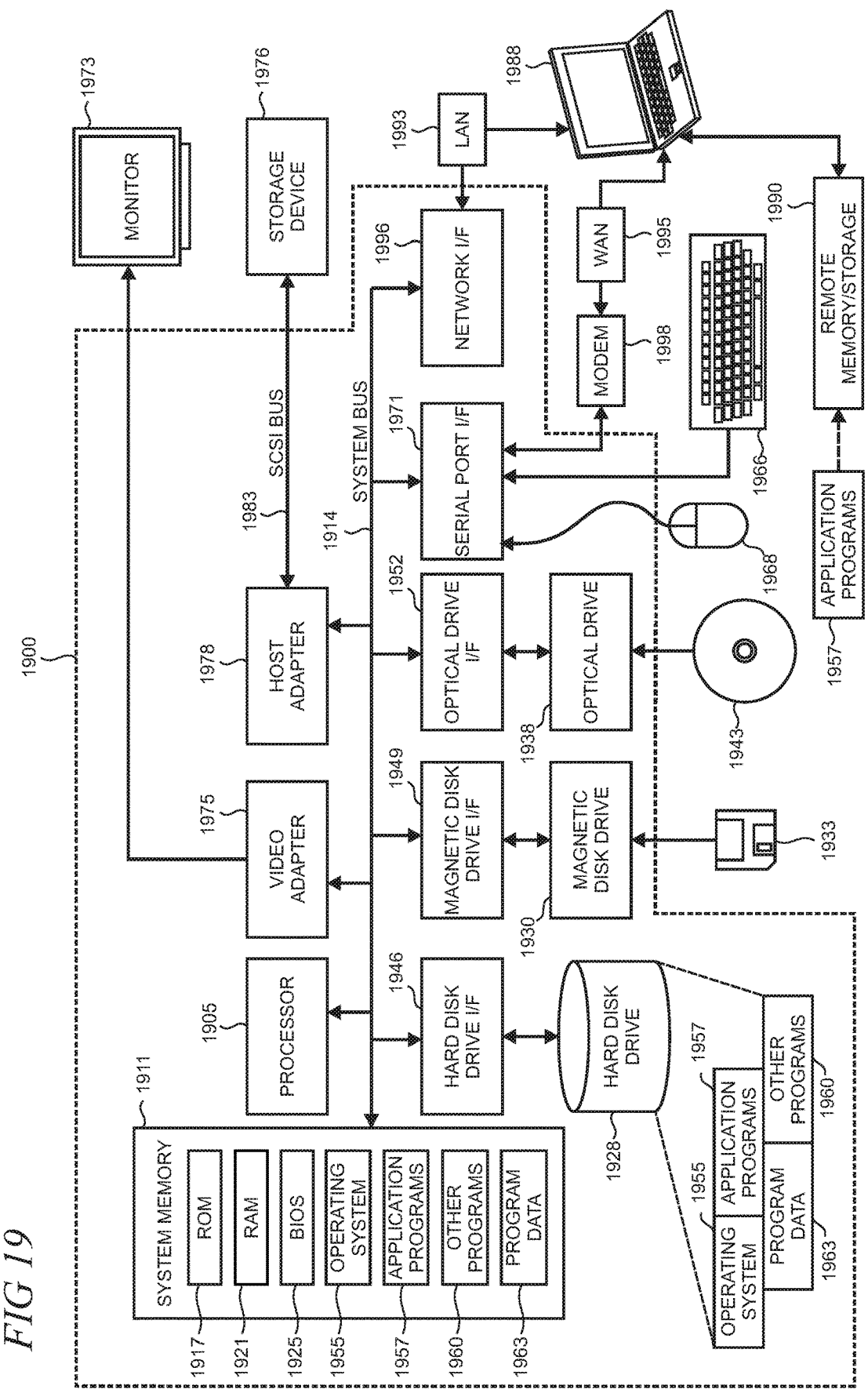
FIG. 19 is a simplified block diagram of an illustrative computer system such as a personal computer (PC) that may be used in part to implement the present hands-free multi-site web navigation and consumption.

FIG. 19 is a simplified block diagram of an illustrative computer system 1900 such as a PC, client machine, or server with which the present hands-free multi-site web navigation and consumption may be implemented. Computer system 1900 includes a processor 1905, a system memory 1911, and a system bus 1914 that couples various system components including the system memory 1911 to the processor 1905. The system bus 1914 may be any of several types of bus structures including a memory bus or memory controller, a peripheral bus, or a local bus using any of a variety of bus architectures. The system memory 1911 includes read only memory (ROM) 1917 and random access memory (RAM) 1921. A basic input/output system (BIOS) 1925, containing the basic routines that help to transfer information between elements within the computer system 1900, such as during startup, is stored in ROM 1917. The computer system 1900 may further include a hard disk drive 1928 for reading from and writing to an internally disposed hard disk (not shown), a magnetic disk drive 1930 for reading from or writing to a removable magnetic disk 1933 (e.g., a floppy disk), and an optical disk drive 1938 for reading from or writing to a removable optical disk 1943 such as a CD (compact disc), DVD (digital versatile disc), or other optical media. The hard disk drive 1928, magnetic disk drive 1930, and optical disk drive 1938 are connected to the system bus 1914 by a hard disk drive interface 1946, a magnetic disk drive interface 1949, and an optical drive interface 1952, respectively. The drives and their associated computer-readable storage media provide non-volatile storage of computer-readable instructions, data structures, program modules, and other data for the computer system 1900. Although this illustrative example includes a hard disk, a removable magnetic disk 1933, and a removable optical disk 1943, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present hands-free multi-site web navigation and consumption. In addition, as used herein, the term computer-readable storage media includes one or more instances of a media type (e.g., one or more magnetic disks, one or more CDs, etc.). For purposes of this specification and the claims, the phrases "computer-readable memory devices," "computer-readable storage media" and variations thereof, are non-transitory and do not include waves, signals, and/or other transitory and/or intangible communication media.

A number of program modules may be stored on the hard disk, magnetic disk 1933, optical disk 1943, ROM 1917, or RAM 1921, including an operating system 1955, one or more application programs 1957, other program modules 1960, and program data 1963. A user may enter commands and information into the computer system 1900 through input devices such as a keyboard 1966 and pointing device 1968 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1905 through a serial port interface 1971 that is coupled to the system bus 1914, but may be connected by other interfaces, such as a parallel port, game port, or universal serial bus (USB). A monitor 1973 or other type of display device is also connected to the system bus 1914 via an interface, such as a video adapter 1975. In addition to the monitor 1973, personal computers typically include other peripheral output devices (not shown), such as speakers and printers. The illustrative example shown in FIG. 19 also includes a host adapter 1978, a Small Computer System Interface (SCSI) bus 1983, and an external storage device 1976 connected to the SCSI bus 1983.

The computer system 1900 is operable in a networked environment using logical connections to one or more remote computers, such as a remote computer 1988. The remote computer 1988 may be selected as another personal computer, a server, a router, a network PC, a peer device, or other common network node, and typically includes many or all of the elements described above relative to the computer system 1900, although only a single representative remote memory/storage device 1990 is shown in FIG. 19. The logical connections depicted in FIG. 19 include a local area network (LAN) 1993 and a wide area network (WAN) 1995. Such networking environments are often deployed, for example, in offices, enterprise-wide computer networks, intranets, and the Internet.

When used in a LAN networking environment, the computer system 1900 is connected to the local area network 1993 through a network interface or adapter 1996. When used in a WAN networking environment, the computer system 1900 typically includes a broadband modem 1998, network gateway, or other means for establishing communications over the wide area network 1995, such as the Internet. The broadband modem 1998, which may be internal or external, is connected to the system bus 1914 via a serial port interface 1971. In a networked environment, program modules related to the computer system 1900, or portions thereof, may be stored in the remote memory storage device 1990. It is noted that the network connections shown in FIG. 19 are illustrative and other means of establishing a communications link between the computers may be used depending on the specific requirements of an application of the present hands-free multi-site web navigation and consumption.

Figure 20:
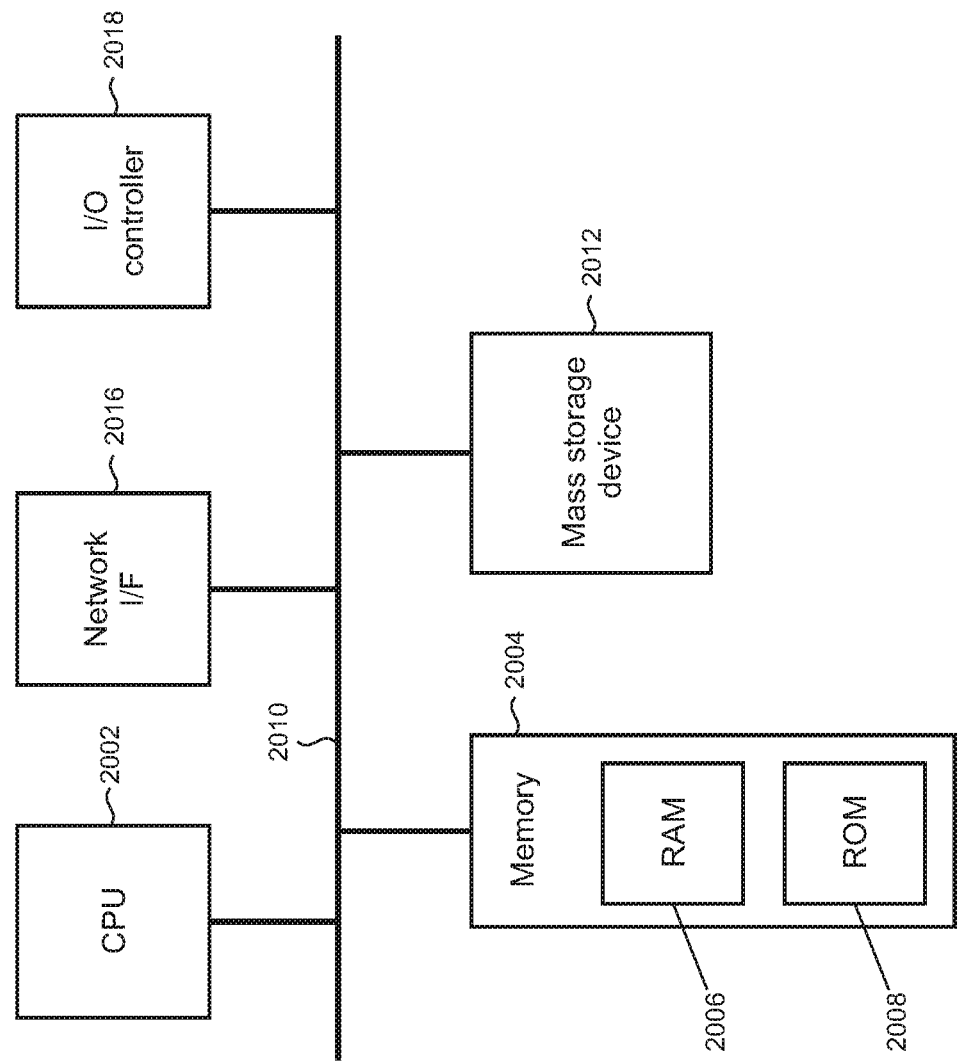
FIG. 20 shows a block diagram of an illustrative device that may be used in part to implement the present hands-free multi-site web navigation and consumption.

FIG. 20 shows an illustrative architecture 2000 for a device capable of executing the various components described herein for providing the present hands-free multi-site web navigation and consumption. Thus, the architecture 2000 illustrated in FIG. 20 shows an architecture that may be adapted for a server computer, mobile phone, a PDA, a smartphone, a desktop computer, a netbook computer, a tablet computer, GPS device, gaming console, and/or a laptop computer. The architecture 2000 may be utilized to execute any aspect of the components presented herein.

The architecture 2000 illustrated in FIG. 20 includes a CPU (Central Processing Unit) 2002, a system memory 2004, including a RAM 2006 and a ROM 2008, and a system bus 2010 that couples the memory 2004 to the CPU 2002. A basic input/output system containing the basic routines that help to transfer information between elements within the architecture 2000, such as during startup, is stored in the ROM 2008. The architecture 2000 further includes a mass storage device 2012 for storing software code or other computer-executed code that is utilized to implement applications, the file system, and the operating system.

The mass storage device 2012 is connected to the CPU 2002 through a mass storage controller (not shown) connected to the bus 2010. The mass storage device 2012 and its associated computer-readable storage media provide non-volatile storage for the architecture 2000.

Although the description of computer-readable storage media contained herein refers to a mass storage device, such as a hard disk or CD-ROM drive, it should be appreciated by those skilled in the art that computer-readable storage media can be any available storage media that can be accessed by the architecture 2000.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2000.

According to various embodiments, the architecture 2000 may operate in a networked environment using logical connections to remote computers through a network. The architecture 2000 may connect to the network through a network interface unit 2016 connected to the bus 2010. It should be appreciated that the network interface unit 2016 also may be utilized to connect to other types of networks and remote computer systems. The architecture 2000 also may include an input/output controller 2018 for receiving and processing input from a number of other devices, including a keyboard, mouse, or electronic stylus (not shown in FIG. 20). Similarly, the input/output controller 2018 may provide output to a display screen, a printer, or other type of output device (also not shown in FIG. 20).

It should be appreciated that the software components described herein may, when loaded into the CPU 2002 and executed, transform the CPU 2002 and the overall architecture 2000 from a general-purpose computing system into a special-purpose computing system customized to facilitate the functionality presented herein. The CPU 2002 may be constructed from any number of transistors or other discrete circuit elements, which may individually or collectively assume any number of states. More specifically, the CPU 2002 may operate as a finite-state machine, in response to executable instructions contained within the software modules disclosed herein. These computer-executable instructions may transform the CPU 2002 by specifying how the CPU 2002 transitions between states, thereby transforming the transistors or other discrete hardware elements constituting the CPU 2002.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 2000 in order to store and execute the software components presented herein. It also should be appreciated that the architecture 2000 may include other types of computing devices, including handheld computers, embedded computer systems, smartphones, PDAs, and other types of computing devices known to those skilled in the art. It is also contemplated that the architecture 2000 may not include all of the components shown in FIG. 20, may include other components that are not explicitly shown in FIG. 20, or may utilize an architecture completely different from that shown in FIG. 20.

Figure 21:
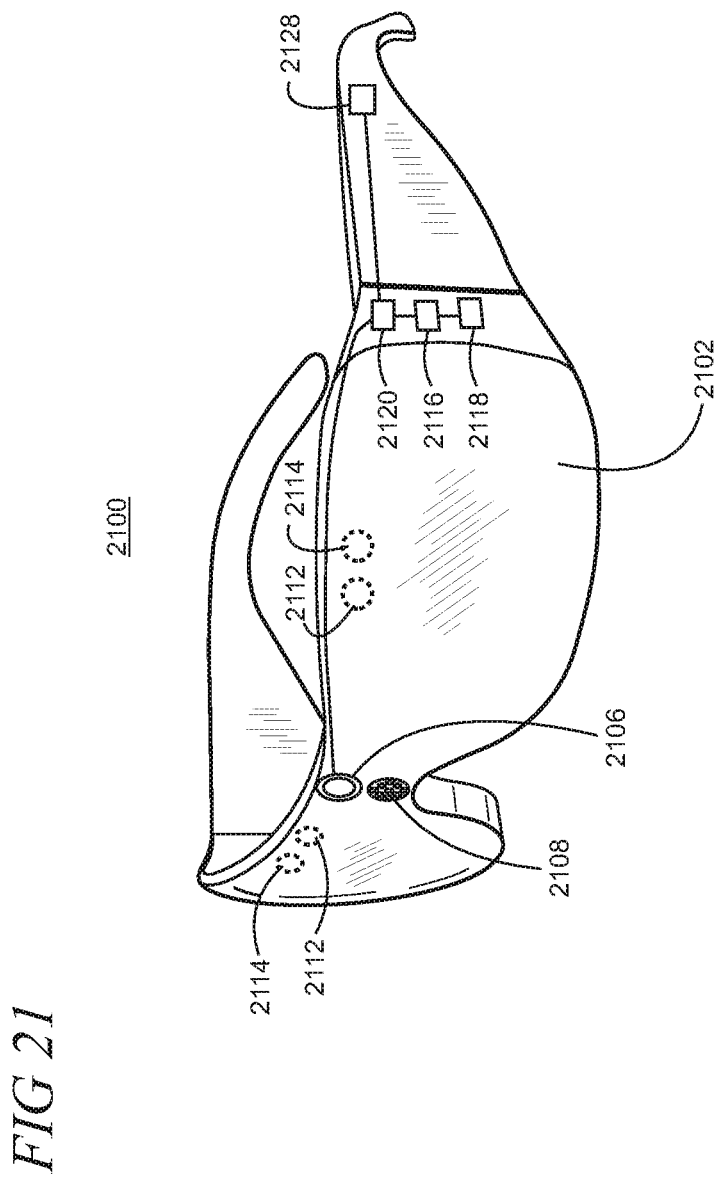
FIG. 21 is a pictorial view of an illustrative example of a virtual reality or mixed reality head mounted display (HMD) device.
Figure 22:
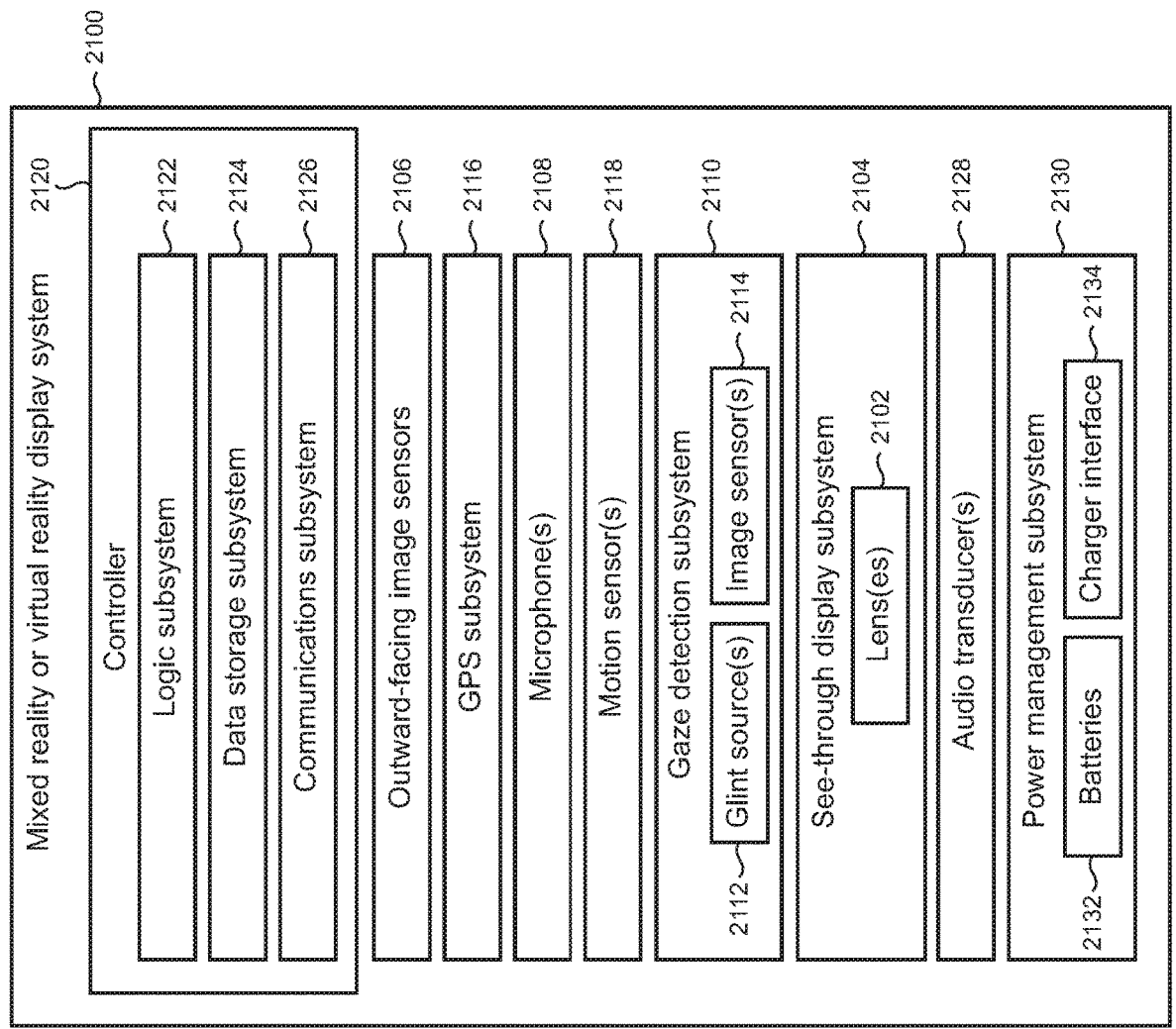
FIG. 22 shows a block diagram of an illustrative example of a virtual reality or mixed reality HMD device.

FIG. 21 shows one particular illustrative example of a see-through, mixed reality or virtual reality display system 2100, and FIG. 22 shows a functional block diagram of the system 2100. Display system 2100 comprises one or more lenses 2102 that form a part of a see-through display subsystem 2104, such that images may be displayed using lenses 2102 (e.g. using projection onto lenses 2102, one or more waveguide systems incorporated into the lenses 2102, and/or in any other suitable manner). Display system 2100 further comprises one or more outward-facing image sensors 2106 configured to acquire images of a background scene and/or physical environment being viewed by a user, and may include one or more microphones 2108 configured to detect sounds, such as voice commands from a user. Outward-facing image sensors 2106 may include one or more depth sensors and/or one or more two-dimensional image sensors. In alternative arrangements, as noted above, a mixed reality or virtual reality display system, instead of incorporating a see-through display subsystem, may display mixed reality or virtual reality images through a viewfinder mode for an outward-facing image sensor.

The display system 2100 may further include a gaze detection subsystem 2110 configured for detecting a direction of gaze of each eye of a user or a direction or location of focus, as described above. Gaze detection subsystem 2110 may be configured to determine gaze directions of each of a user's eyes in any suitable manner. For example, in the illustrative example shown, a gaze detection subsystem 2110 includes one or more glint sources 2112, such as infrared light sources, that are configured to cause a glint of light to reflect from each eyeball of a user, and one or more image sensors 2114, such as inward-facing sensors, that are configured to capture an image of each eyeball of the user. Changes in the glints from the user's eyeballs and/or a location of a user's pupil, as determined from image data gathered using the image sensor(s) 2114, may be used to determine a direction of gaze.

In addition, a location at which gaze lines projected from the user's eyes intersect the external display may be used to determine an object at which the user is gazing (e.g. a displayed virtual object and/or a real background object). Gaze detection subsystem 2110 may have any suitable number and arrangement of light sources and image sensors. In some implementations, the gaze detection subsystem 2110 may be omitted.

The display system 2100 may also include additional sensors. For example, display system 2100 may comprise a global positioning system (GPS) subsystem 2116 to allow a location of the display system 2100 to be determined. This may help to identify real-world objects, such as buildings, etc. that may be located in the user's adjoining physical environment.

The display system 2100 may further include one or more motion sensors 2118 (e.g., inertial, multi-axis gyroscopic, or acceleration sensors) to detect movement and position/orientation/pose of a user's head when the user is wearing the system as part of an augmented reality or virtual reality HMD device. Motion data may be used, potentially along with eye-tracking glint data and outward-facing image data, for gaze detection, as well as for image stabilization to help correct for blur in images from the outward-facing image sensor(s) 2106. The use of motion data may allow changes in gaze location to be tracked even if image data from outward-facing image sensor(s) 2106 cannot be resolved.

In addition, motion sensors 2118, as well as microphone (s) 2108 and gaze detection subsystem 2110, also may be employed as user input devices, such that a user may interact with the display system 2100 via gestures of the eye, neck and/or head, as well as via verbal commands in some cases. It may be understood that sensors illustrated in FIGS. 21 and 22 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 2100 can further include a controller 2120 having a logic subsystem 2122 and a data storage subsystem 2124 in communication with the sensors, gaze detection subsystem 2110, display subsystem 2104, and/or other components through a communications subsystem 2126. The communications subsystem 2126 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 2124 may include instructions stored thereon that are executable by logic subsystem 2122, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 2100 is configured with one or more audio transducers 2128 (e.g., speakers, earphones, etc.) so that audio can be utilized as part of an augmented reality or virtual reality experience. A power management subsystem 2130 may include one or more batteries 2132 and/or protection circuit modules (PCMs) and an associated charger interface 2134 and/or remote power interface for supplying power to components in the display system 2100.

It may be appreciated that the display system 2100 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

Figure 23:
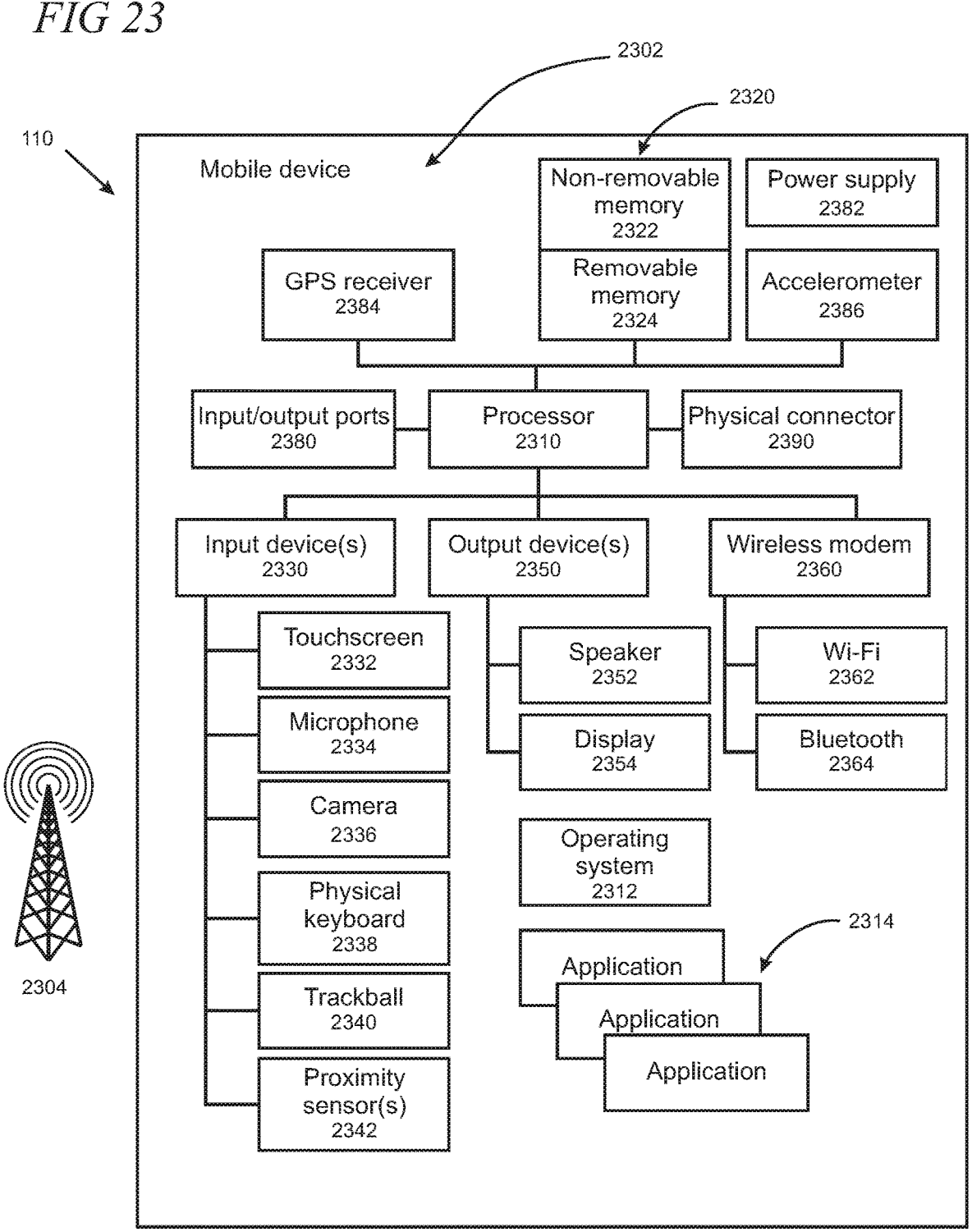
FIG. 23 is a block diagram of an illustrative device such as a mobile phone or smartphone.

FIG. 23 is a functional block diagram of an illustrative device 110 such as a mobile phone or smartphone including a variety of optional hardware and software components, shown generally at 2302. Any component 2302 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 2304, such as a cellular or satellite network.

The illustrated device 110 can include a controller or processor 2310 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 2312 can control the allocation and usage of the components 2302, including power states, above-lock states, and below-lock states, and provides support for one or more application programs 2314. The application programs can include common mobile computing applications (e.g., image-capture applications, email applications, calendars, contact managers, web browsers, messaging applications), or any other computing application.

The illustrated device 2300 can include memory 2320. Memory 2320 can include non-removable memory 2322 and/or removable memory 2324. The non-removable memory 2322 can include RAM, ROM, Flash memory, a hard disk, or other well-known memory storage technologies. The removable memory 2324 can include Flash memory or a Subscriber Identity Module (SIM) card, which is well known in GSM (Global System for Mobile communications) systems, or other well-known memory storage technologies, such as "smart cards." The memory 2320 can be used for storing data and/or code for running the operating system 2312 and the application programs 2314. Example data can include web pages, text, images, sound files, video data, or other data sets to be sent to and/or received from one or more network servers or other devices via one or more wired or wireless networks.

The memory 2320 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the device 110.

The memory 2320 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The device 110 can support one or more input devices 2330 such as a touchscreen 2332; microphone 2334 for implementation of voice input for voice recognition, voice commands, and the like; camera 2336; physical keyboard 2338; trackball 2340; and/or proximity sensor 2342. The device can support one or more output devices 2350, such as a speaker 2352 and one or more displays 2354. Other input devices (not shown) using gesture recognition may also be utilized in some cases. Other possible output devices (not shown) can include piezoelectric or haptic output devices. Some devices can serve more than one input/output function. For example, touchscreen 2332 and display 2354 can be combined into a single input/output device.

A wireless modem 2360 can be coupled to an antenna (not shown) and can support two-way communications between the processor 2310 and external devices, as is well understood in the art. The modem 2360 is shown generically and can include a cellular modem for communicating with the mobile communication network 2304 and/or other radio-based modems (e.g., Bluetooth® 2364 or Wi-Fi 2362). The wireless modem 2360 is typically configured for communication with one or more cellular networks, such as a GSM network for data and voice communications within a single cellular network, between cellular networks, or between the device and a public switched telephone network (PSTN).

The device can further include at least one input/output port 2380, a power supply 2382, a satellite navigation system receiver 2384, such as a GPS receiver, an accelerometer 2386, a gyroscope (not shown), and/or a physical connector 2390, which can be a USB port, IEEE 1394 (FireWire) port, and/or an RS-232 port. The illustrated components 2302 are not required or all-inclusive, as any components can be deleted and other components can be added.

Figure 24:
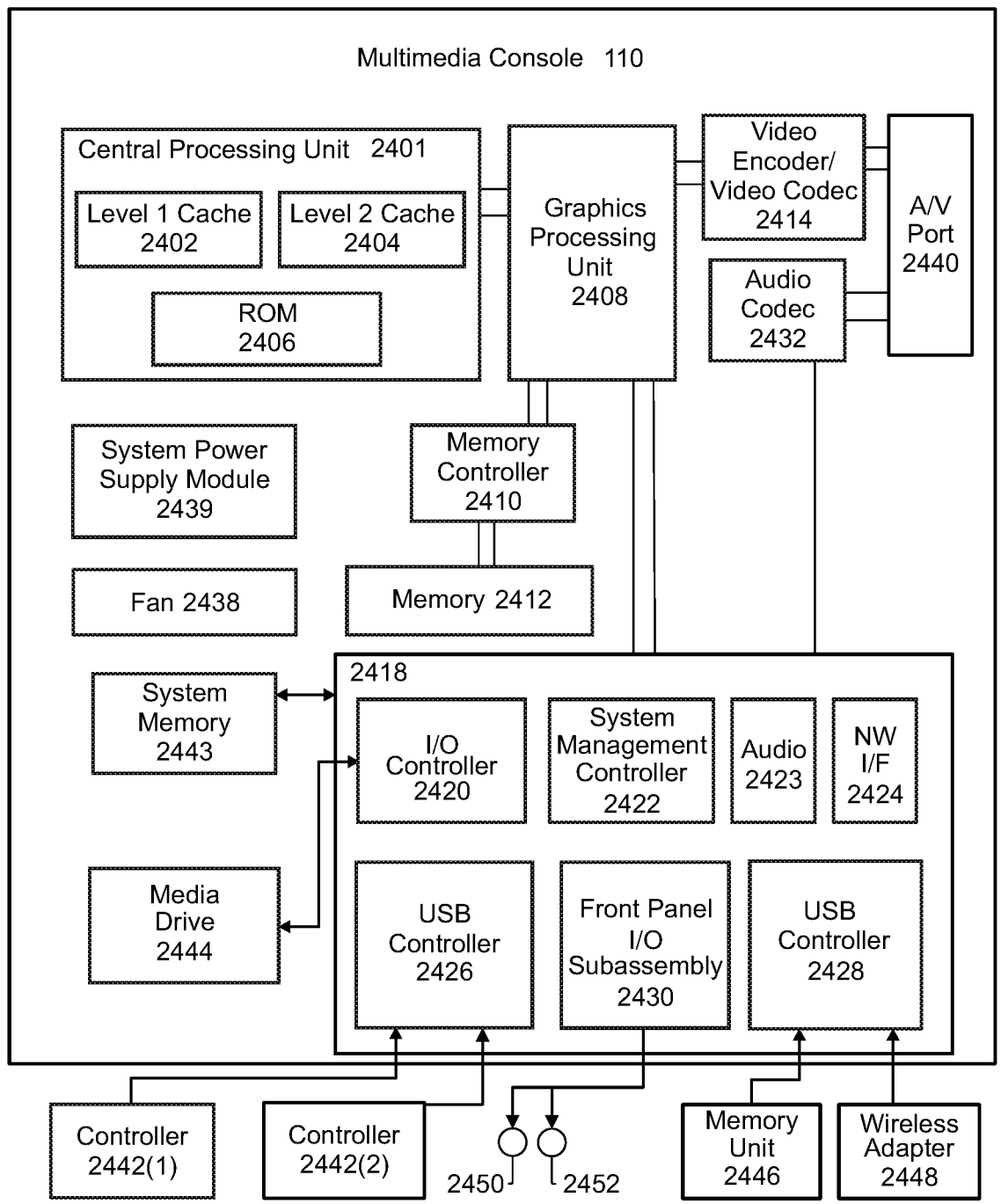
FIG. 24 is a block diagram of an illustrative multimedia console.

FIG. 24 is an illustrative functional block diagram of a multimedia console 110. The multimedia console 110 has a central processing unit (CPU) 2401 having a level 1 cache 2402, a level 2 cache 2404, and a Flash ROM (Read Only Memory) 2406. The level 1 cache 2402 and the level 2 cache 2404 temporarily store data and hence reduce the number of memory access cycles, thereby improving processing speed and throughput. The CPU 2401 may be configured with more than one core, and thus, additional level 1 and level 2 caches 2402 and 2404. The Flash ROM 2406 may store executable code that is loaded during an initial phase of a boot process when the multimedia console 110 is powered ON.

A graphics processing unit (GPU) 2408 and a video encoder/video codec (coder/decoder) 2414 form a video processing pipeline for high speed and high resolution graphics processing. Data is carried from the GPU 2408 to the video encoder/video codec 2414 via a bus. The video processing pipeline outputs data to an A/V (audio/video) port 2440 for transmission to a television or other display. A memory controller 2410 is connected to the GPU 2408 to facilitate processor access to various types of memory 2412, such as, but not limited to, a RAM.

The multimedia console 110 includes an I/O controller 2420, a system management controller 2422, an audio processing unit 2423, a network interface controller 2424, a first USB (Universal Serial Bus) host controller 2426, a second USB controller 2428, and a front panel I/O subassembly 2430 that are preferably implemented on a module 2418. The USB controllers 2426 and 2428 serve as hosts for peripheral controllers 2442(1) and 2442(2), a wireless adapter 2448, and an external memory device 2446 (e.g., Flash memory, external CD/DVD ROM drive, removable media, etc.). The network interface controller 2424 and/or wireless adapter 2448 provide access to a network (e.g., the Internet, home network, etc.) and may be any of a wide variety of various wired or wireless adapter components including an Ethernet card, a modem, a Bluetooth® module, a cable modem, or the like.

System memory 2443 is provided to store application data that is loaded during the boot process. A media drive 2444 is provided and may comprise a DVD/CD drive, hard drive, or other removable media drive, etc. The media drive 2444 may be internal or external to the multimedia console 110. Application data may be accessed via the media drive 2444 for execution, playback, etc. by the multimedia console 110. The media drive 2444 is connected to the I/O controller 2420 via a bus, such as a Serial ATA bus or other high speed connection (e.g., IEEE 1394).

The system management controller 2422 provides a variety of service functions related to assuring availability of the multimedia console 110. The audio processing unit 2423 and an audio codec 2432 form a corresponding audio processing pipeline with high fidelity and stereo processing. Audio data is carried between the audio processing unit 2423 and the audio codec 2432 via a communication link. The audio processing pipeline outputs data to the A/V port 2440 for reproduction by an external audio player or device having audio capabilities.

The front panel I/O subassembly 2430 supports the functionality of the power button 2450 and the eject button 2452, as well as any LEDs (light emitting diodes) or other indicators exposed on the outer surface of the multimedia console 110. A system power supply module 2439 provides power to the components of the multimedia console 110. A fan 2438 cools the circuitry within the multimedia console 110.

The CPU 2401, GPU 2408, memory controller 2410, and various other components within the multimedia console 110 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 110 is powered ON, application data may be loaded from the system memory 2443 into memory 2412 and/or caches 2402 and 2404 and executed on the CPU 2401. The application may present a graphical user interface that provides a consistent user experience when navigating to different media types available on the multimedia console 110. In operation, applications and/or other media contained within the media drive 2444 may be launched or played from the media drive 2444 to provide additional functionalities to the multimedia console 110.

The multimedia console 110 may be operated as a standalone system by simply connecting the system to a television or other display. In this standalone mode, the multimedia console 110 allows one or more users to interact with the system, watch movies, or listen to music. However, with the integration of broadband connectivity made available through the network interface controller 2424 or the wireless adapter 2448, the multimedia console 110 may further be operated as a participant in a larger network community.

When the multimedia console 110 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console 110 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 2401 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 2442(1) and 2442(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches.

Various exemplary embodiments of the present hands-free multi-site web navigation and consumption are now presented by way of illustration and not as an exhaustive list of all embodiments. An example includes a method operating on a computing device that is associated with a user, the computing device having a user interface (UI), the method comprising: configuring the UI to enable the user to select websites for inclusion in a group, and to provide a name for the group of websites; monitoring utilization of the selected websites by the user; listening for a voice input from the user, the voice input including the provided name; in response to the voice input, filtering websites in the group based on the monitored utilization; and opening remaining websites in the group after filtering so that the remaining websites are simultaneously executing.

In another example, the method further includes opening the remaining websites in the group using a browser that executes on the computing device. In another example, the browser is configured with multiple tabs and the method further includes opening each of the remaining websites in the group in a separate respective tab. In another example, the method further includes caching content from the filtered websites in the group on the computing device and opening the cached content on the UI. In another example, the method further includes implementing a digital assistant on the computing device that supports interactions with the user with one or more of voice, gestures, or physical interactions with the computing device. In another example, the method further includes configuring the digital assistant to recognize the provided name and pass an instruction to a browser executing on the computing device to open the remaining websites in the group. In another example, the method further includes configuring the digital assistant to read aloud to the user, using a text-to-speech conversion, content from one or more of the remaining websites in the group. In another example, the method further includes performing the filtering according to one or more of frequency of website use, relevance, user history, or browsing pattern. In another example, the filtering is performed to minimize resource utilization on the computing device by restricting opening of particular ones of the websites in the group, the resources including one or more of battery power, network bandwidth, processing cycles, or memory utilization.

A further example includes a computing device, comprising: one or more processors; a natural language user interface (UI) for interacting with a user of the computing device using voice input from the user and synthesized voice audio from a digital assistant; and one or more memory devices storing computer-readable instructions which, when executed by the one or more processors, cause the computing device to: monitor interactions between the user and a browser that executes on the computing device, generate a personalized group of websites for the user based on the monitored interactions, listen for voice inputs from the user at the natural language UI, launch each of the websites in the personalized group in the browser responsively to the voice inputs from the user, and configure the digital assistant to interact with the browser to provide a screen-less user experience for the user, in which the user experience includes content from the opened websites in the personalized group.

In another example, the instructions further cause the device to associate a name with the personalized group and the voice input used to launch the websites in the personalized group includes the name. In another example, the name is selected by the user through the natural language interface. In another example, the instructions cause the name to be generated by the computing device based on the monitored interactions. In another example, the screen-less user experience is an audio-only user experience by which the digital assistant uses text-to-speech conversion to read content from websites aloud to the user. In another example, the browser is configured with a plurality of tabs, and the websites in the personalized group are opened in respective different tabs.

A further example includes one or more non-transitory computer-readable memory devices storing instructions which, when executed by one or more processors disposed in a computing device, cause the computing device to: provide a user interface (UI) to a user of the computing device, the UI configured to enable the user to create groups of one or more websites; store the groups of one or more websites; receive a voice command at a digital assistant to open a selected one of the stored groups; in response to the received voice command, send instructions to a browser that executes on the computing device; and open websites in the selected group in the browser according to the instructions.

In another example, the groups of one or more websites are stored in folders displayed on the browser. In another example, the instructions cause the browser to open each of the one or more websites in a separate respective tab in the browser. In another example, the instructions cause the digital assistant to read aloud content in an opened website in response to input from the user. In another example, the instructions cause the computing device to filter websites in the selected group from being opened in the browser, the filtering being performed based on past user interactions with websites in the selected group.

Based on the foregoing, it should be appreciated that technologies for hand-free multi-site web navigation and consumption have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method operating on a computing device that is associated with a user, the computing device having a user interface (UI), the method comprising:
    configuring the UI to enable the user to select multiple websites for inclusion in a group, and to provide a name for the group of user-selected websites;
    placing the multiple user-selected websites within the group and associating the user-provided name to the group;
    monitoring utilization of the user-selected websites by the user;
    listening for a voice input from the user using the user-provided name to open the group of user-selected websites within a browser;
    in response to the voice input including the user-provided name for the group, filtering user-selected websites in the group based on the monitored utilization of the user-selected websites, such that certain websites of the user-selected websites within the group are identified for opening within the browser and other user-selected websites within the group are restricted from being opened within the browser; and
    opening the identified ones of the user-selected websites in the group based on the filtering so that the opened websites are simultaneously executing, wherein the identified websites are opened in respective individual tabs within the browser
    in which the filtering is performed to minimize resource utilization on the computing device by restricting opening of particular ones of the websites in the group, the resources including one or more of battery power, network bandwidth, processing cycles, or memory utilization.

2. The method of claim 1 further including caching content from the filtered user-selected websites in the group on the computing device and opening the cached content on the UI.

3. The method of claim 1 further including implementing a digital assistant on the computing device that supports interactions with the user with one or more of voice, gestures, or physical interactions with the computing device.

4. The method of claim 3 further including configuring the digital assistant to recognize the associated name and pass an instruction to the browser executing on the computing device to open remaining websites in the group.

5. The method of claim 4 further including configuring the digital assistant to read aloud to the user, using a text-to-speech conversion, content from the identified ones of the user-selected websites in the group.

6. The method of claim 1 further including performing the filtering according to one or more of frequency of website use, relevance, user history, or browsing pattern.

* * * * *